United States Patent
Ma et al.

(10) Patent No.: US 7,312,819 B2
(45) Date of Patent: Dec. 25, 2007

(54) ROBUST CAMERA MOTION ANALYSIS FOR HOME VIDEO

(75) Inventors: Yu-Fei Ma, Beijing (CN); Hong-Jiang Zhang, Beijing (CN); Dongjun Lan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 10/720,677

(22) Filed: Nov. 24, 2003

(65) Prior Publication Data

US 2005/0110875 A1  May 26, 2005

(51) Int. Cl.
*H04N 5/228* (2006.01)
*G06K 9/00* (2006.01)

(52) U.S. Cl. .................... 348/208.1; 382/107

(58) Field of Classification Search ........... 382/275, 382/170, 103, 107, 236, 168, 199, 239, 268, 382/270, 272, 274, 305; 396/52; 340/982; 345/474, 629; 375/240.16; 348/208.4, 208.6, 348/169, 208.13, 208.1, 699, 208.99; 386/49, 386/52, 55, 68–70, 81, 95, 125

See application file for complete search history.

(56) References Cited

U.S. PATENT DOCUMENTS

| | | | | |
|---|---|---|---|---|
| 4,969,036 A | * | 11/1990 | Bhanu et al. | 348/113 |
| 6,211,912 B1 | * | 4/2001 | Shahraray | 348/228.1 |
| 6,606,409 B2 | * | 8/2003 | Warnick et al. | 382/173 |
| 6,721,454 B1 | * | 4/2004 | Qian et al. | 382/224 |
| 7,010,036 B1 | * | 3/2006 | Mory | 375/240.08 |

OTHER PUBLICATIONS

Dong-Jun Lan et al., Abstract—"A Novel Motion-Based Representation for Video Mining," Paper MD-L3.1, Jul. 9, 2003, 2003 IEEE International Conference on Multimedia, 1 page.
Dong-Jun Lan et al., "A Novel Motion-Based Representation for Video Mining," Jul. 9, 2003, 2003 IEEE International Conference on Multimedia, 4 pages.
Yu-Fei Ma et al., "Motion Pattern based Video Classification and Retrieval," Microsoft Research Asia, Beijing, P.R. China, pp. 1-18.
Yu-Fei Ma et al., "Motion Pattern Based Video Classification Using Support Vector Machines," Microsoft Research Asia, Beijing, China, 4 pages.

(Continued)

*Primary Examiner*—David Ometz
*Assistant Examiner*—Tuan Le
(74) *Attorney, Agent, or Firm*—Lee & Hayes, PLLC

(57) ABSTRACT

A robust camera motion analysis method is described. In an implementation, a method includes analyzing video having sequential frames to determine one or more camera motions that occurred when sequential frames of the video were captured. The one or more camera motions for each frame are described by a set of displacement curves, a mean absolute difference (MAD) curve, and a major motion (MAJ) curve. The set of displacement curves describe the one or more camera motions in respective horizontal (H), vertical (V), and radial (R) directions. The MAD curve relates a minimum MAD value from the set of displacement curves. The MAJ curve is generated from the minimum MAD value and provides one or more qualitative descriptions that describe the one or more camera motions as at least one of still, vertical, horizontal and radial.

40 Claims, 13 Drawing Sheets

OTHER PUBLICATIONS

Rainer Leinhart, "Comparison of Automatic Shot Boundary Detection Algorithms," Microcomputer Seesearch Labs, Intel Corporation, Santa Clara, CA, pp. 1-12.

Xiaoming Liu et al., "Shot Boundary Detection Using Temporal Statistics Modeling," Electrical and Computer Engineering, Carnegie Mellon University, Pittsburgh, PA, USA, 4 pages.

Junghwan Oh et al., "Automatic Distinction of Camera and Object Motions in Video Sequences," Dept. of Computer Science and Engineering, University of Texas at Arlington, Arlington, TX USA, 4 pages.

Dong-Jun Lan et al., "A Systemic Framework of Camera Motion Analysis for Home Video," Dept. of Electronic Engineering, Tsinghua University, Beijing, China, Sep. 2003, 4 pages.

Yu-Fei Ma et al., "A User Attention Model for Video Summarization," Microsoft Research Asia, Beijing, China, Dec. 2002, 10 pages.

Xian-Sheng Hua et al., "AVE—Automated Home Video Editing," Microsoft Research Asia, Beijing, P.R. China, MM'03, Nov. 2-8, 2003, Berkeley, CA USA, 8 pages.

* cited by examiner

US 7,312,819 B2

ROBUST CAMERA MOTION ANALYSIS FOR HOME VIDEO

TECHNICAL FIELD

The present invention generally relates to the field of videos and more particularly to robust camera motion analysis for home video.

BACKGROUND

A vast amount of video content (videos) is being produced continually virtually everywhere around the world. Additionally, videos are available from a variety of sources, such as from television stations, from home users, from websites via distribution over the Internet, from video-on-demand systems, and so on. Although some videos are labeled and categorized when they are produced or distributed, most videos are not labeled and/or categorized. Therefore, locating a desired video by labels or categories may be difficult.

A movie production company, for example, may distribute a movie which includes a title and other information about the movie, such as type of content (e.g., comedy, drama, action), author, actors, and so on. Therefore, a user desiring access to the movie may utilize a variety of techniques to locate the movie, such as by title, name of one or more of the actors, and so on. Additionally, the movie may be formatted such that a user may navigate to desired scenes in the movie. Other video sources, however, may not include the labeling and formatting that is provided in the movie as previously described. For example, an amateur home user may utilize a home video recorder to capture home movies. The home user, however, may fail to label the home movies. Therefore, if the home user wishes to locate a particular home movie from a plurality of previously recorded home movies, the home user may be faced with a difficult task of accessing and viewing each of the home movies to find the particular home movie.

Video processing techniques have been developed to enable users to manage, access, and/or review collected videos. For example, video processing techniques may be employed to divide and label scenes in a video, to retrieve a particular video of interest, and so on. Traditional video processing techniques, however, are typically designed for high quality video and do not address camera shaking and irregular motions that are encountered in low quality videos. Therefore, low quality videos, such as home videos, are not helped by traditional video processing techniques with respect to enabling home users to manage, access, and/or review collected videos.

Motion may be utilized to characterize segments of a video. By analyzing motion, the segments of the video may be characterized by the motions involved in frames making up the segments. Therefore, effective representation of motion in videos may benefit video processing techniques, such as video content analysis, video mining tasks, and video retrieval. Traditional video processing techniques, as mentioned above, do not compensate for irregular camera motions and camera shaking and therefore may provide erroneous characterization of the motions in low quality videos. Additionally, traditional video processing techniques often involve high computational complexity. Therefore, even if traditional video processing techniques were available to a home user, the home user may not have access to sufficient computational resources to process the home videos by utilizing the traditional video processing techniques.

Accordingly, there is a continuing need for camera motion analysis that addresses low quality videos.

SUMMARY

Camera motion analysis of video is described. Camera motion analysis may be provided through a systematic framework that involves qualitative analysis of one or more camera motions that were performed when capturing sequential frames of a video. The framework may provide a uniform method for describing camera motion which may consider camera motion related issues as whole. The described camera motions may then be utilized by video processing techniques, such as shot boundary detection, camera shaking detection, and camera motion characterization. The processing speed of the proposed camera motion analysis approach is faster than that of traditional video processing techniques. Additionally, the described camera motions may address camera shaking and irregular camera motions that may occur in low quality video, such as a home video. In this way, the framework increases the accuracy of the video processing techniques for low quality video.

In various implementations, video having sequential frames is analyzed to determine one or more camera motions that occurred when the sequential frames were captured. The one or more camera motions for each frame are described by a set of displacement curves, a mean absolute difference (MAD) curve, and a major motion (MAJ) curve. The set of displacement curves describe the one or more camera motions in horizontal, vertical and radial directions, and are referred to herein as the H, V, and R displacement curves. The MAD curve relates a minimum MAD value from the set of displacement curves. The MAJ curve is generated from the minimum MAD value and provides one or more qualitative descriptions that describe the one or more camera motions as at least one of still, vertical, horizontal and radial. In other implementations, a shot boundary is detected in the sequential frames from an abrupt transition of respective minimum MAD values.

BRIEF DESCRIPTION OF THE DRAWINGS

The same reference numbers are utilized in instances in the discussion to reference like structures and components.

DETAILED DESCRIPTION

Overview

Camera motion analysis as described herein may be provided through a systematic framework that applies video processing techniques to low quality videos, such as home videos and the like. These video processing techniques may include shot boundary detection, camera shaking detection, camera motion characterization, and so on. For example, camera motion analysis of video may provide a description of one or more camera motions that occurred at the time when sequential frames of the video were captured. Other video processing techniques may utilize the camera motion description in the analysis of videos. Through use of the described camera motions, for example, a video and/or scenes in a video may be classified for later retrieval from storage. For instance, a plurality of scenes, i.e. "shots", may be identified in a video. By identifying scenes in the video, the scenes may be labeled, and the labeled scenes may be indexed for later retrieval from storage. Therefore, a user wishing to locate a particular scene may utilize the index of labels to retrieve the particular scene. In this way, the user may navigate through a vast amount of videos that are available to the user to locate a desired video without viewing each individual video and/or every scene in each video.

Exemplary Environment

Figure 1:
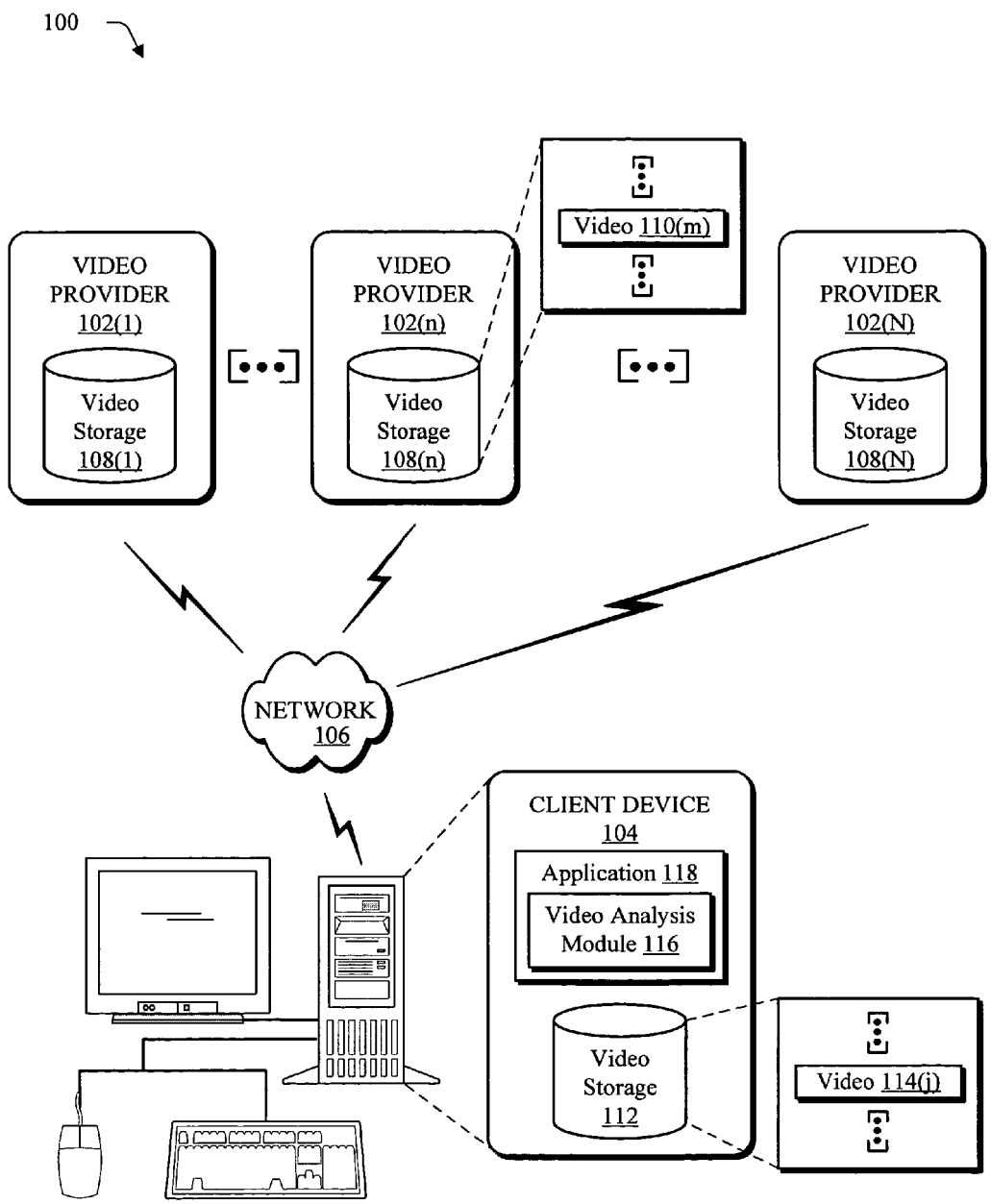
FIG. 1 is an illustration of an exemplary implementation showing an environment in which a plurality of video providers provide videos that are available to a client device over a network.

FIG. 1 is an illustration of an exemplary implementation showing an environment 100 in which a plurality of video providers 102(1), . . . , 102(n), . . . , 102(N) provide videos that are available to a client device 104 over a network 106. Video provider 102(n) may be any video provider from two to "N". The client device 104 may be configured in a variety of ways. For example, the client device 104 may be configured as a computer that is capable of communicating over the network 106, such as a desktop computer as illustrated, a mobile station, an entertainment appliance, a set-top box, and so forth. The client device 104 may also relate to a person and/or entity that operates the client device 104. In other words, client device 104 may describe a logical client that includes a user and/or a machine. Although one client device 104 is illustrated, a plurality of client devices may be communicatively coupled to the network 106. The network 106 is illustrated as the Internet, and may also include a variety of other networks, such as an intranet, a wired or wireless telephone network, and so forth.

Each of the video providers 102(1), 102(n), 102(N) includes respective video storage 108(1), 108(n), 108(N). Video storage 108(1)-108(N) is configured from memory that may be utilized to store one or more videos. For example, video storage 108(n) of video provider 102(n) is illustrated as storing a plurality of videos 110(m), where "m" can be any number from 1 to "M". The plurality of videos 110(m) may be configured in a variety of ways, such as a movie, a television program, a video-on-demand, a home movie, and so on.

The client device 104 may communicate with one or more of the video providers 102(1)-102(N) to obtain one or more of the plurality of videos 10(m). Additionally, the client device 104 may also include video storage 112 to locally store a plurality of videos 114(j), where "j" can be any number from 1 to "J". The plurality of videos 114(j) may be the same as or different from the plurality of videos 110(m) of the video provider 102(n). For example, the plurality of videos 114(j) of the client device 104 may be home movies, while the videos 110(m) may be television programs. In another example, the plurality of videos 114(j) may be locally stored copies of the plurality of videos 110(m) of the video provider 102(n) that were obtained by the client device 104 over the network 106. In this way, the environment 100 provides a user of the client device 104 with access to videos from a wide variety of sources, both locally on the client device 104 itself and also over the network 106 from the plurality of video providers 102(1)-102(N).

To enable the user to navigate through the plurality of videos 110(m), 1140), the client device 104 includes a video analysis module 116. The video analysis module 116, when executed by the client device 104, may provide a variety of video processing techniques that may be applied to the plurality of videos 110(m), 114(j). The video processing techniques may be utilized to process the plurality of videos 110(m), 114(j) such that the user may locate a particular video and/or segment of a video of interest.

The video analysis module 116, for example, may be included as a part of an application 118 that enables the user to store and modify the plurality of videos 114(j). The video analysis module 116, when executed by the client device 104, may analyze one or more of the videos 114(j) utilizing a variety of video processing techniques. For instance, one such video processing technique is shot boundary detection which may be utilized to detect scenes in the videos 114(j). Shot boundary detection is utilized to segment a continuous frame sequence of a video into visually consistent segments, i.e. "shots". The visually consistent segments may then be indexed for later retrieval. Thus, each shot may be labeled so that a desired shot may be located.

A variety of other video processing techniques may also be utilized, such as camera shaking detection, camera motion characterization, and so on. For example, camera shaking may indicate an undesirable segment of a video. Therefore, the segments of the video that contain camera shaking may be removed by a user. Further discussion of camera shaking detection may be found in relation to FIG. 11. Camera motion characterization may be utilized to identify segments of a video, such as to identify regular camera motions, irregular camera motions, still, camera shaking, and so on. Regular camera motions, for instance, may indicate different video capturing techniques, such as panning and zooming, that are utilized to capture frames of different subjects. Therefore, by characterizing the camera motions, a user may be provided with information that may be utilized to differentiate between different segments of a video. Further discussion of camera motion characterization may be found in relation to FIG. 12.

As previously described, the video processing techniques may enable the user to navigate to a particular desired scene, obtain the desired scene, identify the number of scenes in the video, and so on. In this way, the video analysis module 116 may improve the interaction of the user with the plurality of videos 110(m), 114(j). For instance, the video analysis module 116 may be executed by the client device 104 to identify scenes in the plurality of videos 114(j) that are formatted as home movies. By identifying the scenes in the videos 114(j), the user may rearrange the scenes, locate a desired scene, and perform other video processing techniques.

Although execution of the video analysis module 116 for locally stored videos 114(j) has been described, the video analysis module 116 may also be executed on the client device 104 to provide video processing techniques for the plurality of videos 110(m) that are available over the network 106. For example, in another implementation, the application 118 is configured as a multimedia search engine. Due to the increasing pervasiveness of the Internet, users may gain access to an ever increasing amount of videos, such as through the video storage 108(1)-108(N) on the respective video providers 102(1)-102(N). Because of this ever increasing amount of videos, it may become even more difficult for the user to manually view each video to find a particular video or scene in a video. For instance, videos 110(m) that are available over the network 106, like the home videos previously described, may also be provided in a form such that users are not able to determine the characteristics of the videos without actually viewing the videos. Therefore, to improve interaction of the user with the videos, the video analysis module 116 may be executed to provide video processing techniques to process the plurality of videos 110(m). For example, the video analysis module 116, when executed by the client device 104, may detect scenes in the videos 110(m) and then characterize the scenes, such as through characterized camera movement in each of the scenes as will be described in greater detail in relation of FIGS. 12. The application 118, when configured as a multimedia search engine, may then locate desired scenes through use of the characterized camera movement. A further discussion of video processing techniques may be found in the "Motion Based Analysis of Video" section.

Framework for Camera Motion Analysis

Figures 2A, 2B:
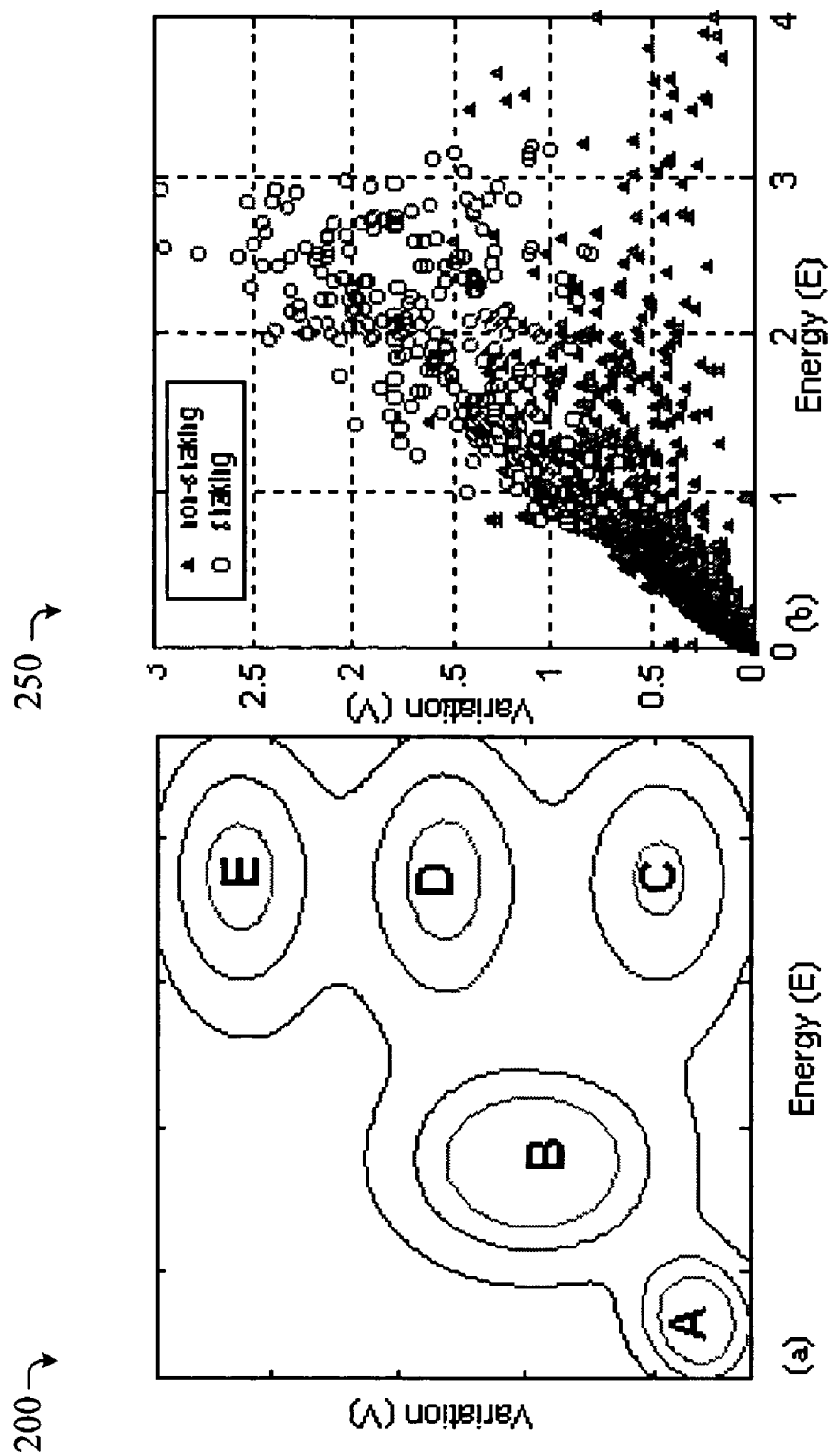
FIG. 2A is a graph showing exemplary characterizations of camera motions.
FIG. 2B is an illustration of a graph showing an exemplary distribution of camera motion in home videos, where the graph was obtained from 1630 manually labeled samples, including 180 shaking samples.

A framework is provided that includes qualitative and quantitative analysis to provide video processing techniques that may be utilized on low quality video, such as home videos. The framework is based upon an investigation on motion energy (E) and variation (Var). Variation may be defined by any reasonable result of motion estimation. FIG. 2A is an illustration of a graph 200 which depicts camera motions that may be encountered in home videos that are characterized according to human perception. The camera motions are characterized according to five types of camera motion, which are illustrated in FIG. 2A, as Regions "A", "B", "C", "D", and "E". Region A represents still camera motion, which has low E and Var values. In contrast, Region E represents camera shaking, which has high E and Var values. Region B represents camera vibration, i.e. slight camera shaking, which usually cannot be perceived by the human eye. Therefore, in an implementation, the motions in Region B may be considered as still camera motion for purposes of evaluation as will be described in greater detail in relation to the "Motion Based Analysis of Video" section.

Region C represents stable motions, i.e. "regular" camera motions, such as panning and zooming. Between Regions C and E, there are some irregular camera motions that are defined by Region D. Although the motions of Region D have considerable motion energy, the variations are lower than that of camera shaking as represented by Region E. Hence, the motions in Region D are neither perceived as camera shaking nor regular motions. FIG. 2B is an illustration of a graph 250 showing an exemplary distribution of camera motions in home videos that was obtained from 1630 manually labeled samples, and includes 180 shaking samples.

Figure 3:
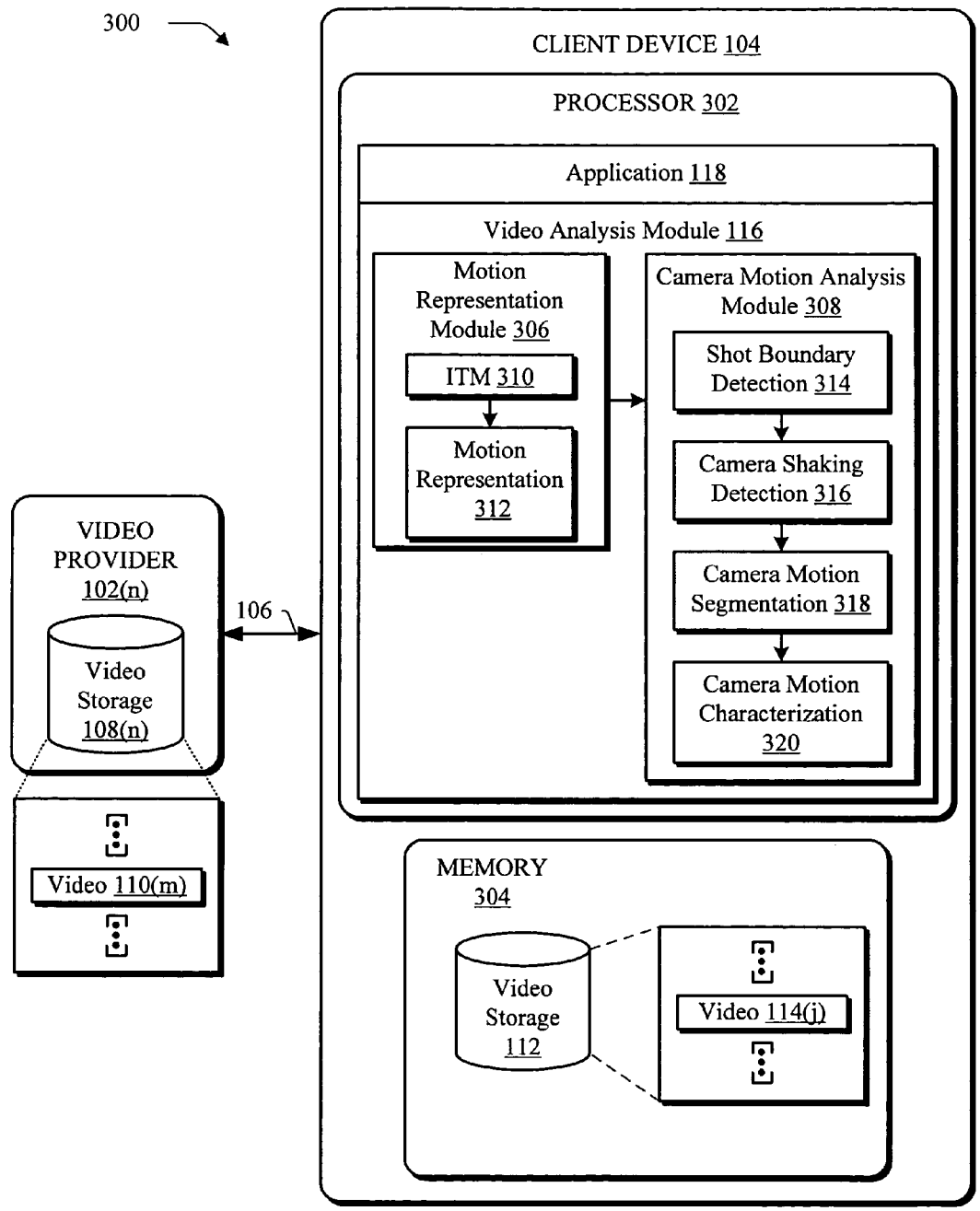
FIG. 3 is an illustration of an exemplary implementation showing one of the video providers and the client device of FIG. 1 in greater detail.

FIG. 3 is an illustration of an exemplary implementation 300 showing the video provider 102(n) and client device 104 of FIG. 1 in greater detail. The client device includes a processor 302 and memory 304. The client device 104 also includes the video analysis module 116 which is illustrated as being executed on the processor 302 and is storable in the memory 304. Video storage 112 is illustrated as included in the memory 304, but may also be configured as separate from the memory 304. For example, although a single memory 304 is illustrated, the client device 104 may include a variety of memories having different configurations. The client device 104, for instance, may include a hard disk drive for video storage 112 and RAM for use during execution of the video analysis module 116 on the processor 302.

As shown in FIG. 3, the video analysis module 116 may be divided into two parts: a motion representation module 306 and a camera motion analysis module 308. The motion representation module 306 includes a fast motion estimation method, such as Integral Template Matching (ITM) 310, to extract basic motion information between sequential frames of a video. The output of ITM 310 may be utilized through motion representation 312 to generate one or more sets of qualitative and quantitative representative curves. Further description of curve generation may be found in relation to FIGS. 4 and 5.

The qualitative and quantitative curves may then be utilized by the camera motion analysis module 308 for a variety of video processing techniques. For example, video processing techniques may include shot boundary detection 314, camera shaking detection 316, camera motion segmentation 318, and camera motion characterization 320. Further description of the video processing techniques utilizing the qualitative and quantitative curves may be found in relation to FIGS. 6 and 7.

The motion representation module 306, the camera motion analysis module 308, and the included software components therein illustrate an exemplary framework for camera motion analysis. The following discussion will address each of the modules in a respective section.

Motion Representation Module

In the motion representation module 306, motion information may be extracted by employing an Integral Template Matching (ITM) 310 algorithm. The ITM 310 algorithm will serve as the basis for generating quantitative and qualitative curves that describe camera motion. In the following discussion, an "Integral Template Matching" section will be discussed first, followed by a "Qualitative Motion Representation" section. The "Qualitative Motion Representation"

section describes the use of the results of the ITM 310 by motion representation 312 to generate curves that describe camera motion.

Integral Template Matching (ITM)

Integral Template Matching (ITM) provides a qualitative motion estimation approach to estimate which, if any, camera motions were performed to capture the frames of the video. Camera motions may include irregular camera motion, camera shaking, still camera motion, and regular camera motion as described previously in relation to FIGS. 2A and 2B. Still, as the name implies, describes video in which the camera is not moved or moved a minimal amount, such as camera vibration of Region B of FIG. 2A. Regular camera motions may be further categorized into panning, tilting, zooming, tracking, booming, and dollying. Each of the camera motions is described in the following discussion in relation to motion that is apparent to the human eye when viewing the frames that compose the video. For example, panning describes horizontal motion of frames when capturing or displaying video, i.e. left or right horizontal rotation. Panning may be achieved utilizing a horizontal camera pivot from a stationary position to move right to left or left to right. Therefore, when a user views the frames of the video, horizontal motion of the camera is apparent to the human eye.

Tilting describes vertical movement of frames when capturing or displaying video, i.e. vertical rotation. Tilting may be achieved by moving the camera in a vertical direction, up or down, from a stationary position. Zooming describes variation of the focal distance between the camera and an object, such as through use of a zoom lens. Tracking describes apparent horizontal transverse movement. For example, to track an object, the movement of the camera is laterally aligned with the moving object such that the background appears to move. In this example, the camera maintains a specified distance from the moving object. Booming, like tracking, describes transverse movement, but in this case the movement is in a vertical direction.

Dollying describes horizontal lateral movement of the camera either toward the object or away from the object. Dollying may appear similar to zooming, which appears to reduce or magnify an object. Dollying toward or away from the object, however, maintains perspective while changing size of the object in the frame. Although a variety of regular camera motions have been described, numerous combinations may also be utilized to further describe camera motions. For example, panning and tilting may be described together.

To simplify description of the various camera motions, a three-parameter motion model is utilized. The three-parameter motion model measures dominant motion between subsequent frames of a video in three independent directions, horizontal, vertical and radial. Let (H, V) describe translational factors "horizontal" and "vertical", respectively. Let R represent the radial factor. The three-parameter motion model may be defined as shown in Equation (1):

$$\begin{pmatrix} x' \\ y' \end{pmatrix} = R \begin{pmatrix} x \\ y \end{pmatrix} + \begin{pmatrix} H \\ V \end{pmatrix} \quad (1)$$

Through use of the three parameters H, V, and R, description of the camera motions is simplified by modeling the camera motions together, such as panning/tracking, tilting/booming, and zooming/dollying. For example, changes in (H, V) are often caused by camera panning/tracking and tilting/booming, respectively. Changes in R are usually caused by camera zooming/dollying. By simplifying the description of the camera motions, the three-parameter motion model effectively reduces the computation burden of processing a video and enhances the robustness of qualitative analysis, as is discussed in greater detail in the "Motion Based Analysis of Video" section.

Figure 4:
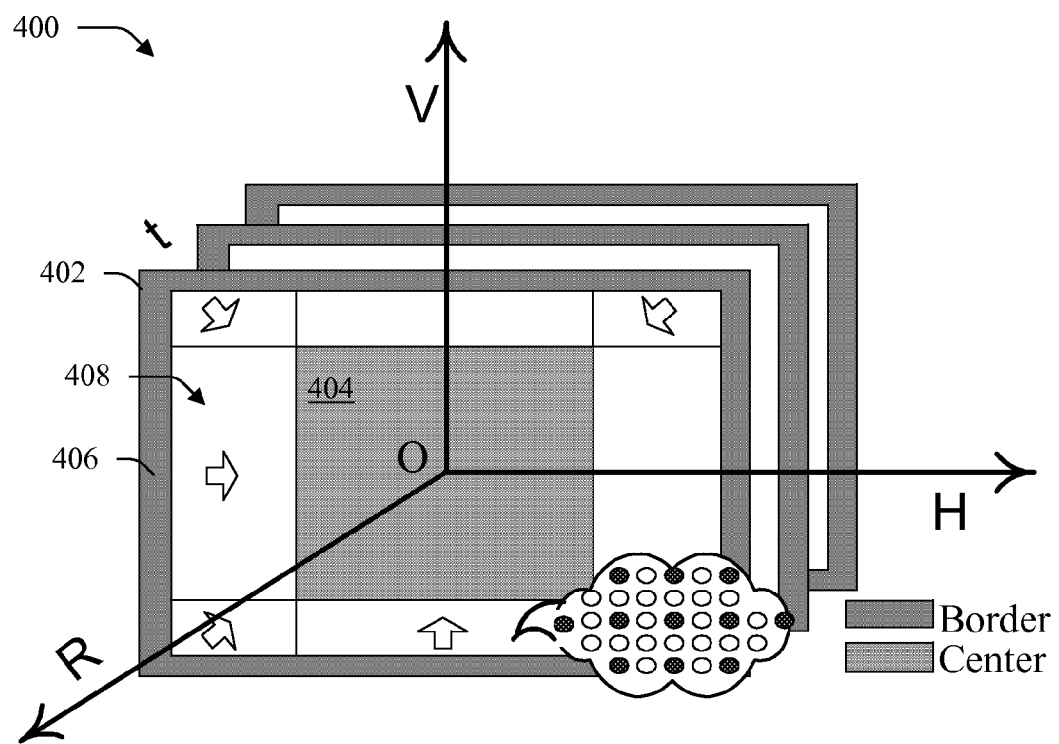
FIG. 4 is an illustration of an exemplary implementation showing an integral matching template for use by an integral matching template algorithm to analyze sequential frames of a video.

FIG. 4 is an illustration of an exemplary implementation showing an integral matching template 400 for use by the ITM 310 algorithm of FIG. 3. Camera motion may be estimated by reference to dominant motion of pixels in the frame 402 with respect to another frame. In each frame, however, camera motions often mix with object motions that may cause inaccurate camera motion estimation. For example, an object may move within the frame such that movement of the object does not correspond to the domination motion of the frame 302. Additionally, object motions near a center of the frame 402 may overly influence camera motion estimation, especially for radial variations. Therefore, portions of the frame 402 may be removed through use of the integral matching template 400 to more accurately perform camera motion estimation without increasing the computational cost of performing the estimation. For example, in the illustrated integral matching template 400, a center portion 404 of the frame 402 is not included. In other words, pixels located in the center portion 404 are not considered for camera motion estimation. In the illustrated implementation, the size of the center portion 404 is half of the area of the frame 402.

Additionally, pixels positioned at the border 406 of the frame 402 are also not included in the template 400 to increase accuracy of camera motion estimation and reduce computational cost. For example, pixels at the border 406 of the frame 402 may have diminished qualities and thus may not be suitable for integral template matching. The diminished qualities may result from a camera aberration and/or from errors encountered when compressing the frame 402. Therefore, the template 400 includes a motion detection region 408 that is defined between the center portion 404 and the border 406 that is utilized to determine displacement of matching pixels.

Figure 5:
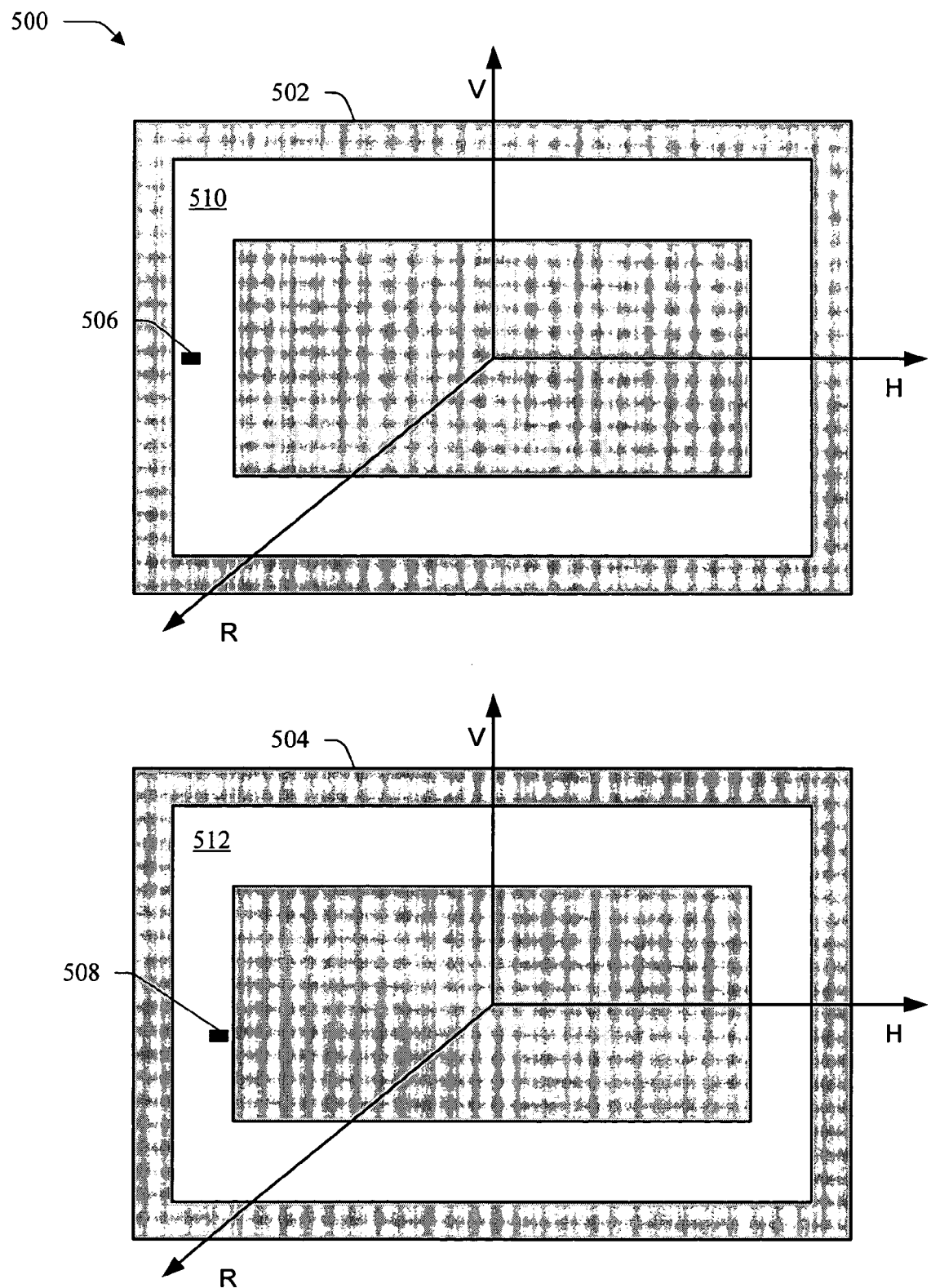
FIG. 5 is an illustration of an exemplary implementation showing sequential first and second frames of a video that are utilized to determine dominate camera motion.

FIG. 5 is an illustration of an exemplary implementation showing first and second frames 502, 504 of a video that are utilized to determine dominate camera motion. A variety of techniques may be utilized to determine dominant motion, and therefore one or more camera motions that were performed when capturing sequential frames of a video. In one implementation, matching pixels 506, 508 are selected from respective motion detection regions 510, 512 of respective first and second frames 502, 504. Displacement of the matching pixels 506, 508 is then utilized to determine the dominate motion of the second frame 504 with respective to the first frame 502 and therefore estimate camera motion.

For camera motion along the horizontal axis and/or the vertical axis (which are illustrated, respectively, as "H" and "V" in FIG. 5 and the following equations), a substantial number of the matching pixels of the motion detection regions 510, 512 are translated by the same displacement. For example, a substantial number of matching pixels located in the motion detection region 510 of the first frame 502 are translated the same amount and direction when compared with the motion detection region 512 of the second frame 504. As previously discussed, pixels that are not translated by the same displacement and direction may be caused by movement of the object that is represented by the pixel. If the pixel is included in a moving object, for instance, the pixel may be displaced in a direction and amount that differs from other pixels in the motion detection regions 508, 510 of the respective first and second frames 502, 504.

For radial motions (illustrated as "R" in FIG. 5 and the following equations), however, the matching pixels 506, 508 may not be equally displaced. For example, the nearer a pixel's position is to the center of focus of the radial motion, the smaller the radial displacement. Therefore, radial movement of matching pixels may be detected and described through proportional translation based on each respective pixel's position in the frame 502. For instance, pixels located nearer the center of the radial motion may be displaced a proportionally smaller amount that pixels located away from the center of the radial motion. In this manner, the three basic dominant motions of horizontal, vertical, and radial are addressed under a uniform framework.

To find the matching pixels 506, 508, a variety of matching criterion may be utilized. For example, Mean Absolute Difference (MAD) may be employed based on luminance (L) of the matching pixels 506, 508. For instance, the MAD between $k^{th}$ frame, e.g. first frame 502, and $(k+1)^{th}$ frame, e.g. second frame 504, may be computed as shown in Equation (2):

$$MAD(\Delta x) = \frac{1}{N} \sum_{x \in T} \left| L(x + \Delta x, k + 1) - L(x, k) \right| \quad (2)$$

"T" is the set of matching pixels in the template of integral matching, and "N" is the total number of matching pixels. With such criterion, motion estimation may be achieved through error minimization in parameter state space (H, V, R). For example, for each translation axis (H, V, R), the optimal matching is obtained when the minimum MAD is reached, as shown in Equation (3).

$$(H, V, R) = \arg\min_{\Delta x \in \psi} MAD(\Delta x) \quad (3)$$

"Ψ" is the state space of camera motion candidates. The camera motion candidate that yields the best match is the optimal estimation of camera motion.

To further increase the efficiency of the computations performed to determine dominant motion, a search strategy may be utilized having one or more rules. Because the dominant motion may be described as a qualitative result, as opposed to a precise quantitative result, precise quantitative analysis is not needed for a qualitative characterization even though the result may be suboptimal. Therefore, four elementary rules may be utilized to reduce the computations used to determine dominant motion, and therefore increase the speed of the camera motion estimation. A first such rule states that if the initial dominant motion displacement in a frame is consistent with a prior frame's dominant motion, the initial dominant motion is regarded as the start point of search.

The second rule provides for use of different search windows for each of the three directions. By limiting a search window to find displacement of matching pixels in subsequent frames, the estimation may be performed in a more efficient manner. Additionally, through use of the different search windows, the search may be optimized based on the size of likely displacements of camera motion. For example, displacement along a horizontal axis, e.g. when panning, may be greater than displacement along a vertical axis, e.g. when tilting. Additionally, displacement encountered along the radial axis, i.e. when zooming, may be even lower. Therefore, a maximum horizontal search window for a matching pixel may be specified as eight pixels, a maximum vertical search window may be specified as four pixels, and a maximum radial search window may be specified as two pixels. Thus, the size of the respective search windows corresponds to magnitudes of movement that may be encountered between sequential frames along the respective axes.

The third rule specifies that if the matching error begins to increase, the search for optimal matching is stopped. As previously stated, camera motion estimation may be achieved through error minimization in parameter state space (H, V, R). Optimal matching is obtained when the minimum MAD is reached, as shown in Equation (3). The matching error decreases monotonically when the template moves closer to optimal matching. Therefore, if the matching error begins to increase, the template is moving away from optimal matching, and the search process is stopped.

The fourth rule specifies that each search step is performed for integral, i.e. whole, pixels to reduce computational costs. It may be difficult, however, to detect slow camera motions having pixel displacements between two respective sequential frames that are less than one pixel. If such a slow camera motion continuously occurs, a visual effect may be perceived after a significant period of time. To handle this instance, an accumulating window (w frames) is adopted, which accumulates the trend of slow camera motion. For example, if the displacement accumulated within "w" frames, i.e. the accumulating window, with the same camera motion trend reaches one pixel, the mean displacement is regarded as displacement in each frame within the "w" frames.

Qualitative Motion Representation

Figure 6:
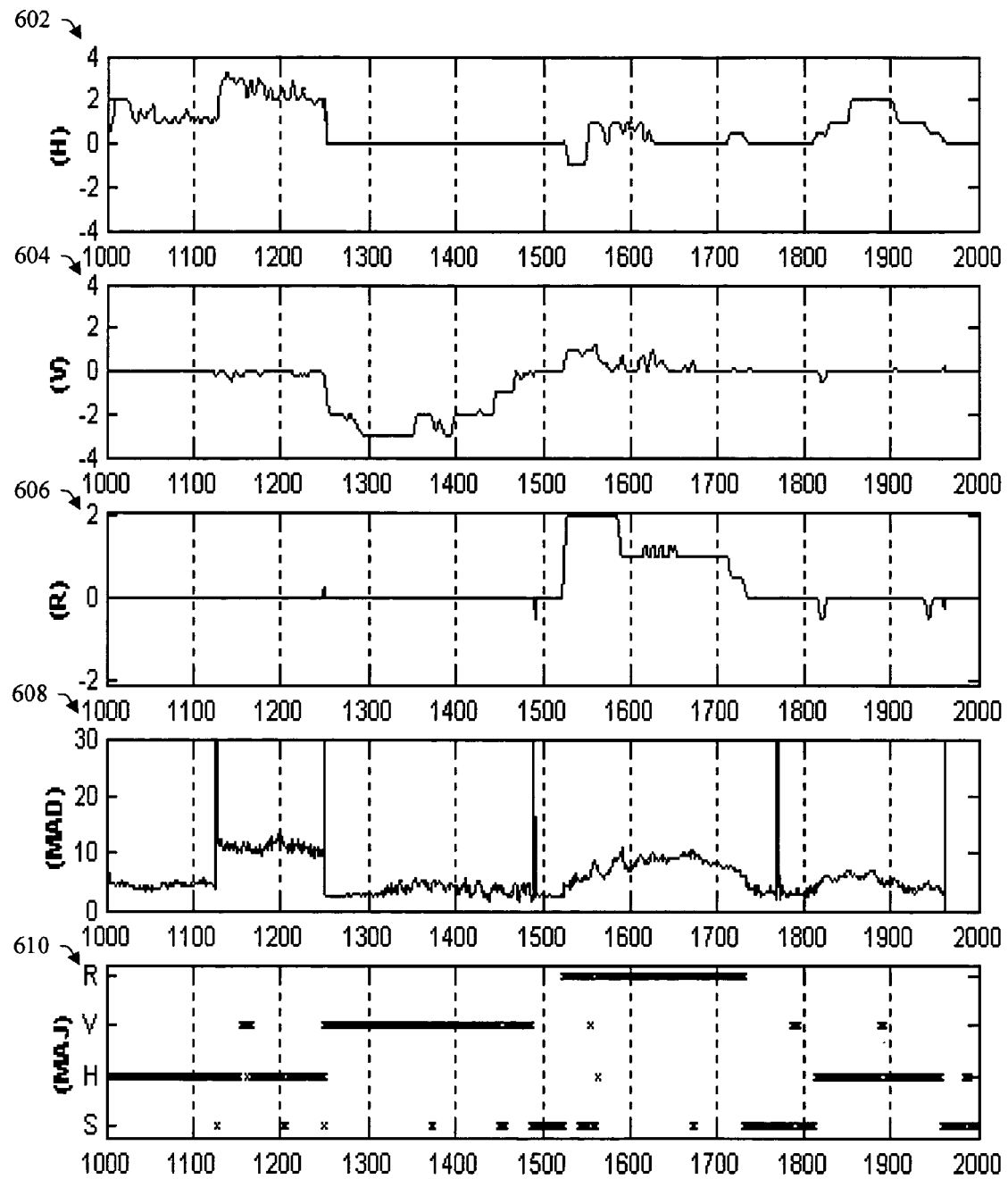
FIG. 6, is an illustration of five curves that describe camera motion, which include H, V, and R displacement curves that quantitatively describe camera motion, respectively, along horizontal, vertical and radial directions, a minimum mean absolute difference (MAD) curve which shows a minimum MAD value among the three directions shown in the H, V, R curves, and a MAJ curve which is a qualitative description of dominant motion.

Based on the results of ITM, four quantitative curves and one qualitative curve may be generated that effectively characterize camera motion between sequential frames in a video. As shown in FIG. 6, the top three curves are displacement curves. The H, V, and R displacement curves 602, 604, 606 quantitatively describe dominant motion along the H, V, and R axes, respectively, for camera motions in each frame of a video. The fourth curve is a mean absolute difference (MAD) curve 608 which describes a minimum MAD value among the three directions shown in the H, V, R displacement curves 602, 604, 606 for each frame of the video. The minimum MAD value may be utilized as a measure for the similarity between frames, which may be useful in video processing techniques, as will be described in greater detail in relation to FIG. 10.

The major motion (MAJ) curve 610 is a qualitative description of camera motion that may be still, horizontal, vertical, or radial. In the MAJ curve 610, the qualitative description is determined from the minimum MAD value of the MAD curve 608. The H, V, and R displacement curves 602, 604, 606, the MAD curve 608, and/or the MAJ curve 610 may be utilized in motion based analysis of video, as will be described in greater detail in the following section.

Motion Based Analysis of Video

The qualitative and quantitative descriptions provided by the H, V, and R displacement curves 602, 604, 606, the MAD curve 608, and/or the MAJ curve 610 may be utilized in a variety of video processing techniques. Examples of such video processing techniques include shot boundary detection, camera shaking detection, and camera motion characterization, each of which is discussed separately in the following sections.

Shot Boundary Detection

As previously mentioned, the MAD curve 610 may be utilized to measure frame similarity. The MAD curve 610 is extracted based on camera motion as previously described, and therefore is able to provide a good criterion for shot boundary detection. Shot boundary detection is utilized to segment a continuous frame sequence of a video into visually consistent segments, i.e. "shots". The visually consistent segments may then be indexed for later retrieval. Additionally, each "shot" may be labeled so that the shots may be indexed and located. For example, each "shot" may be characterized according to regular camera motions that are detected in the shot. Additional discussion of characterization of camera motions may be found in the "Camera Motion Characterization" section.

The MAD curve 610 may be utilized to differentiate between abrupt changes between two or more frames that indicate a transition between two shots, as opposed to continuous camera motions that may be observed within each of the shots. For example, the existence of abrupt transition may be implied when a MAD value reaches a sharp peak in the MAD curve 610. The existence of the abrupt transition may therefore indicate the beginning of a new shot.

An N-frames sliding window is employed to search for a shot boundary in a video. The presence of an abrupt transition is checked at the central frame, denoted by k in the following equation, of the N-frames sliding window. For example, if the MAD value of the central frame satisfies the following criteria shown in Equations (4), (5), and (6), an abrupt transition is detected at the central frame.

$$MAD(k) = \max(MAD(i)), i = k - N/2, \ldots, k + N/2 \quad (4)$$

$$MAD(k) \geq \alpha_{low} MAD_{sm} + \beta \quad (5)$$

$$MAD(k) \geq \alpha_{high} \frac{\sum_{i=-N/2, i \neq k}^{N/2} MAD(i)}{N} + \beta \quad (6)$$

Equation (4) is the preliminary criterion because the abrupt transition occurs at the frame having the local maximum of the MAD value. The second criterion of Equation (5) is applied to suppress negative influences caused by camera flashes and shaking. For example, camera flashes often produce two consecutive sharp peaks while camera shakings may produce a couple of irregularly spaced peaks. In the third criterion of Equation (6), a self-adaptive threshold is imposed to handle instances in which fast motions are encountered. Fast motions usually generate continuous large values in the MAD curve. In Equations (5) and (6), $\alpha_{low}$, $\alpha_{high}$ and $\beta$ are constants, and $MAD_{sm}$ is a second maximum of the sliding window. As the features used in shot boundary detection are based on camera motion estimation, the described implementation may be utilized to effectively determine shot boundaries even when irregular camera motions and camera shaking is encountered.

Camera Shaking Detection

In order to detect camera shaking, motion energy E and variation Var are defined based on H, V, R curves 602, 604, 606. As previously stated, the H, V, and R curves 602, 604, 606 describe dominant motion in three directions, namely, horizontal, vertical and radial. Given a segment of a video from $t_1$ to $t_2$ frames, the average energy and average variation of this segment along three directions is computed by Equations (7) and (8), respectively.

$$E = \frac{1}{t_2 - t_1} \sqrt{\sum_x \left( \int_{t_1}^{t_2} |x| dt \right)^2}, x \in \{H, V, R\} \quad (7)$$

$$\mathrm{Var} = \frac{1}{t_2 - t_1} \sum_x \left( \int_{t_1}^{t_2} |\nabla_x| dt \right), x \in \{H, V, R\} \quad (8)$$

"∇" is a differential operator to compute relative variation. Based on the two measures of E and Var obtained from Equations (7) and (8), respectively, a distribution is obtained of shaking and non-shaking in E-Var space.

As shown in FIG. 2B, it may be difficult to find an optimal characterization even though the shaking and non-shaking samples present distinctive patterns in E-Var space. Therefore, Bayesian criteria may be utilized to find an optimal decision. Use of Bayesian criteria starts with the formulation of a model that describes a situation of interest, i.e. an optimal characterization. A prior distribution is then formulated over the unknown parameters of the model to capture beliefs about the situation before the data is addressed. After observing a portion of the data, Bayes' Rule is applied to obtain a posterior distribution for the unknowns, which takes account of both the prior distribution and the data. From this posterior distribution, predictive distributions may be computed for future observations. Bayesian criteria may be used to detect camera shaking and irregular camera motion as described in the following implementation.

As previously discussed in relation to FIG. 2A, camera shaking has intensive motion and rapid variations. The problem is simplified into two decisions in the E and Var axes, respectively. First, the E and Var axes may be quantified to a plurality of levels, such as 100 levels, respectively. Then, in each level, the number of samples is accumulated. In this manner, a probabilistic distribution of camera shaking and non-shaking along E and Var are obtained, respectively, as shown in FIG. 7.

Figure 7:
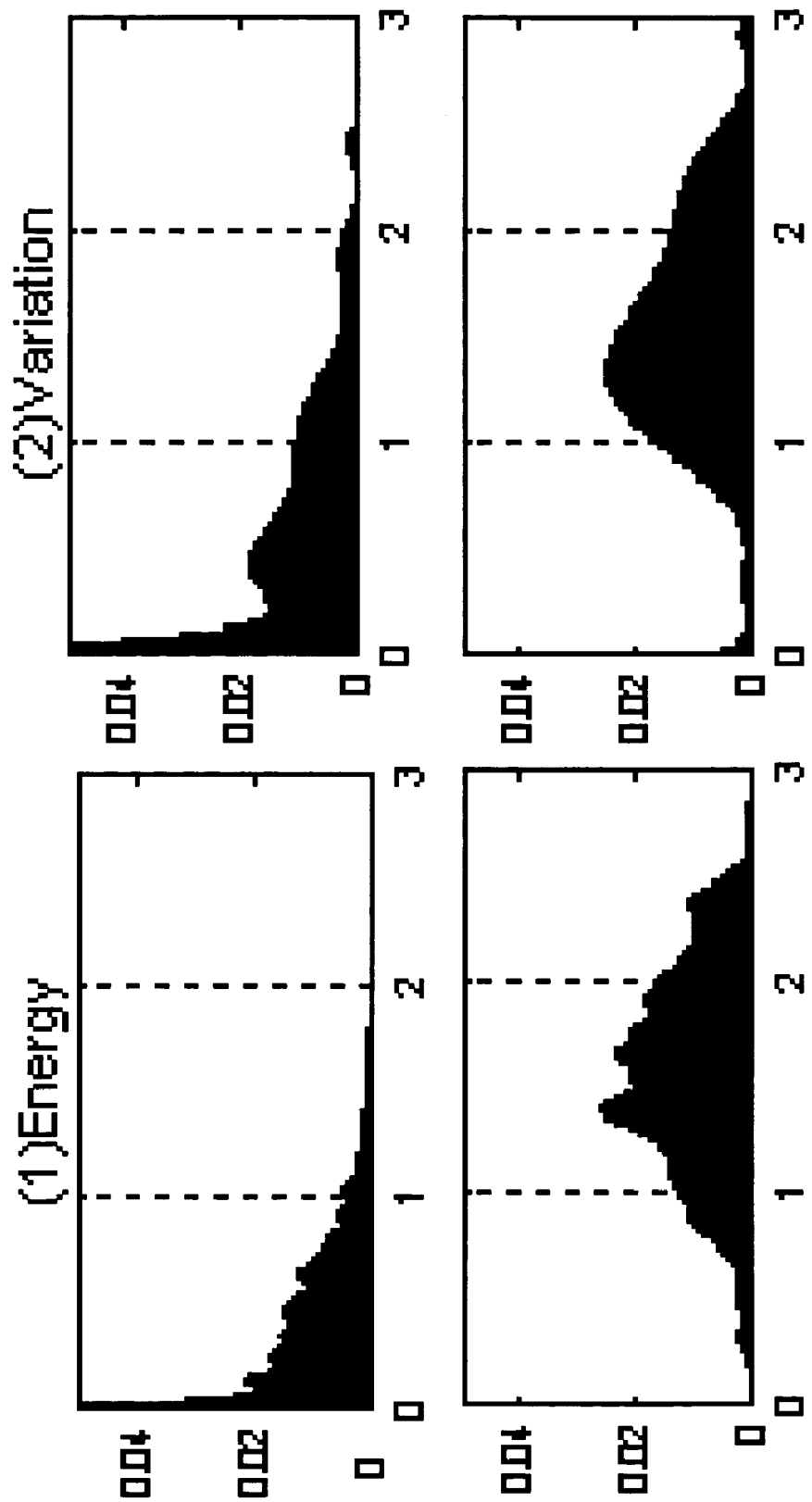
FIG. 7 is an illustration of a graph showing a probabilistic distribution of camera shaking and non-shaking along E and Var axes.

According to FIG. 7, S is a hypothesis that the segment is shaking and $\bar{S}$ is a hypothesis that the segment is non-shaking, average error probability $P_E$ is computed as shown in Equation (9).

$$P_E = P(S) \int_{R_{\bar{S}}} p(x|S) dx + P(\bar{S}) \int_{R_S} p(x|\bar{S}) dx \quad (9)$$

P(S) and P($\bar{S}$) are the prior probabilities for existence of shaking and non-shaking, respectively, $R_{\bar{S}}$ is a missed detection area and $R_S$ is a false detection area. Based on the minimization of $P_E$, the optimal decision is provided by likelihood ratio test as shown in Equation (10):

$$T = \log \frac{P(S)P(E|S)}{P(\bar{S})P(E|\bar{S})} \begin{matrix} \bar{S} \\ < \\ > \\ S \end{matrix} 0 \quad (10)$$

According to Equation (10), optimal decisions $T_E$ and $T_V$ are obtained. The segments satisfying these two decisions are regarded as camera shaking. With the two decision metrics, camera shaking is detected by a sliding window on H, V, R curves. Although the previous example discussed detection of camera shaking, similar techniques may be utilized to detect irregular camera motions.

Camera Motion Characterization

As previously discussed, a variety of video processing techniques may be employed to process video such that segments of the video may be indexed and located. One such technique involves characterizing camera motions that occur in frames of the video. For example, camera motions that occur in frames of a video may be characterized as one of still camera motion, camera shaking, irregular camera motion, and one or more regular camera motions as was shown in relation to FIG. 2A. Regular motions may be further characterized as panning, tilting, zooming, tracking, booming, dollying, and any combination thereof. Therefore, a user may locate frames in a video based on the characterized camera motions. For example, a user may wish to locate a scene having frames in which the camera zooms in on an object. By utilizing the camera motion characterization, segments of the video including such frames may be quickly located without requiring the user to manually view each frame of the video.

Figure 8:
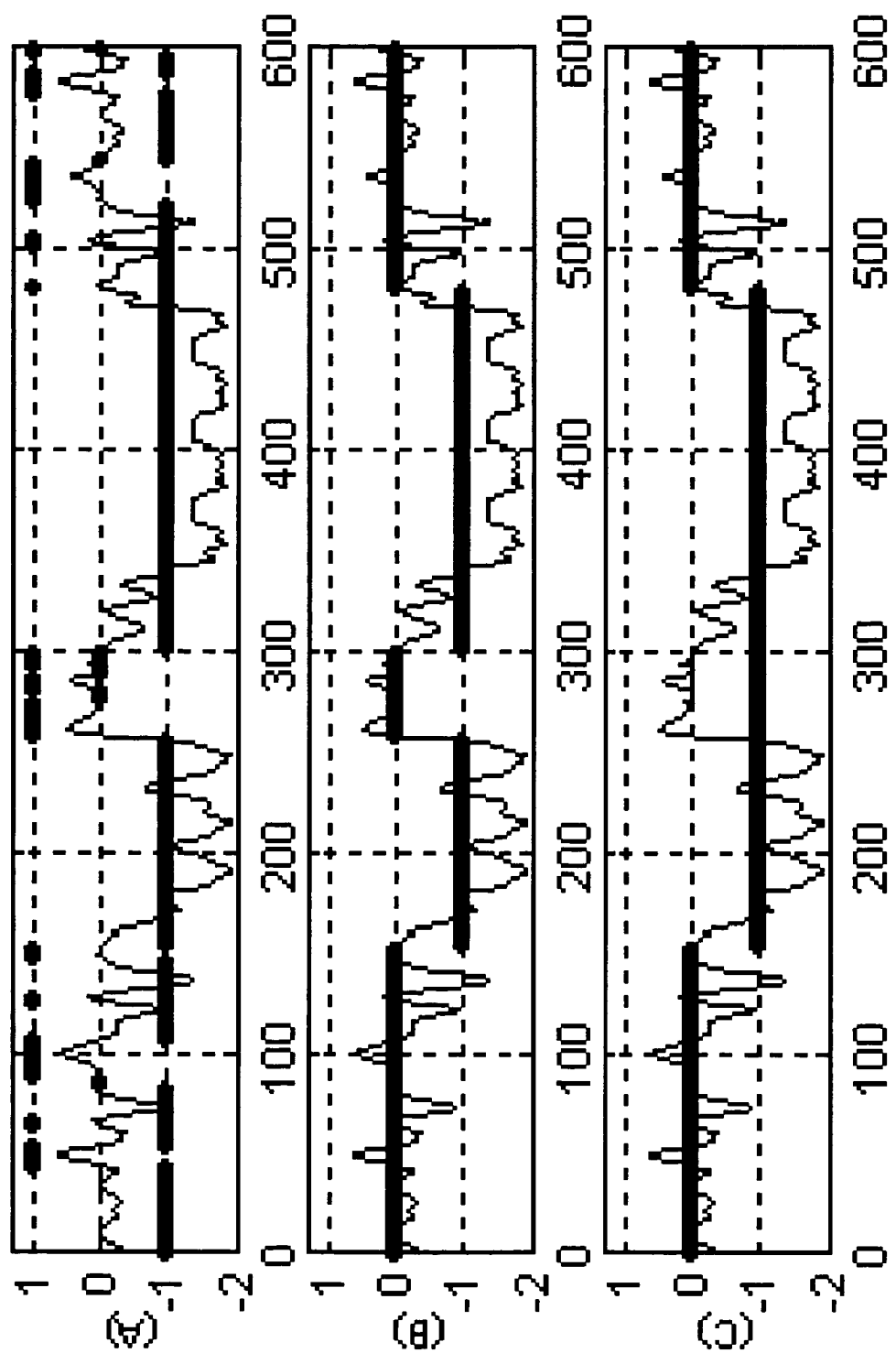
FIG. 8 is an illustration of an example of morphological filtering.

Regular motions in a video may be further segmented into coherent motions through use of morphological operations. Morphological operations are employed to filter out unstable motions from H, V, R curves 602, 604, 606 of FIG. 6 in order to avoid two types of error, over segmentation and false alarm, which are usually caused by camera vibrations and irregular motions. First, an open operation is used to remove unstable motions. Then the interrupted regular motions are connected by a close operation. The results of morphological filtering are shown in FIG. 8. Curve (A) 802 is an original motion curve and its direction. Curve (B) 804 is the result of an opening operation that is performed on Curve (A) 802. Curve (C) 806 is the result of a closing operation that is performed on Curve (B) 804.

After morphological filtering, a sliding window is employed to identify camera motion boundaries based on the original curve, i.e. Curve (A) 802, and the filtered curves, i.e. Curves (B) and (C) 804, 806. Final results are obtained by merging the overlap segments on the three curves, i.e. Curves (A), (B), and (C) 802, 804, 806. For example, if there are continuous motion segments on H and V curves labeled pan-right and tilt-up respectively, which overlap each other in time, the H and V curves are merged to form a motion segment labeled as pan-right-up. In this manner, regular motions of the camera are labeled. The leftover segments are irregular camera motion or still camera motion, which are also distinguished and labeled by MAJ curve 610 in FIG. 6.

Based on camera shaking detection and motion segmentation, camera motions in home video may be characterized. Examples of camera motion characterizations include pan (left/right), tilt (up/down), zoom (in/out), camera shaking, still, irregular motion and combinations thereof. For still segments, the energy and variation may be computed to include slight vibration because, as previously stated, slight camera vibration is generally not perceivable by the human eye and therefore may be considered as still.

Motion speed of regular motions may also be computed by average displacement within motion segment based on H, V, R curves 602, 604, 606. Although this motion speed is not actual velocity of dominant motion, the motion speed may be beneficial for qualitative analysis.

Evaluation

This section evaluates exemplary results of shot boundary detection, camera shaking detection and camera motion characterization separately. Testing data for shot boundary detection was chosen from a collection of TREC2002 Video Track. The total duration of testing videos was three hours and twenty-two minutes. The testing videos were categorized into three classes that include movie, documentary and cartoon. As is shown in Table 1, the overall Recall is 97.07% and Precision is 92.16%. As camera motion is taking into account, the shot boundary diction is robust to intensive motion in videos, as if often encountered in low quality videos, such as home movies.

TABLE 1

Shot boundary detection evaluation

| | Cut | Detect | Miss | False | Recall (%) | Precision (%) |
|---|---|---|---|---|---|---|
| I | 367 | 378 | 5 | 16 | 98.64 | 95.77 |
| II | 127 | 144 | 7 | 24 | 94.49 | 83.33 |
| III | 69 | 69 | 4 | 4 | 94.20 | 94.20 |
| Overall | 581 | 612 | 17 | 48 | 97.07 | 92.16 |

The testing data for camera shaking detection and camera motion characterization included five home videos with a total duration of one hour and twenty-two minutes. The evaluation results of camera shaking detection are given in Table 2. As is shown in Table 2, overall Recall is 82.13% and Precision is 80.90%.

TABLE 2

Camera shaking detection evaluation

| | Total | Detect | Miss | False | Recall (%) | Precision (%) |
|---|---|---|---|---|---|---|
| I | 37 | 37 | 5 | 5 | 86.49 | 86.49 |
| II | 20 | 25 | 3 | 8 | 85.00 | 68.00 |
| III | 25 | 26 | 4 | 5 | 84.00 | 80.77 |
| IV | 23 | 26 | 5 | 8 | 78.26 | 69.23 |
| V | 13 | 11 | 3 | 0 | 76.92 | 100.00 |
| Overall | 118 | 125 | 20 | 27 | 82.13 | 80.90 |

Table 3 relates evaluation results of camera motion characterization. The camera motions of Table 3 were classified as still, camera shaking, irregular motion and regular camera motions. The regular camera motions include three subclasses that describe panning, tilting and zooming. The precision ratios of motion segmentation and motion classification were defined by Equations (11) and (12), respectively.

$$SPR = CS/T\ Shot \qquad (11)$$

$$TPR = CTS/T\ Seg \qquad (12)$$

TShot is the total number of shots, CS is the number of shots correctly segmented, TSeg is the number of camera motion segments in all shots, and CTS is the number of camera motion segments correctly labeled. As shown in Table 3, the average segmentation precision ratio was above 85% and the average classification precision ratio was above 87%. Segmentation error was classified into three types: (1) inserted boundary, (2) missed boundary, and (3) inaccurate boundary position. The statistical error rates of the three types of segmentation error were 56.1%, 10.2% and 33.7% respectively.

TABLE 3

Camera motion characterization valuation

|  | TSh t | CS | SPR (%) | TSeg | CTS | TPR (%) |
|---|---|---|---|---|---|---|
| I | 21 | 19 | 90.48 | 106 | 88 | 83.19 |
| II | 46 | 39 | 84.78 | 103 | 90 | 87.38 |
| III | 9 | 7 | 77.78 | 71 | 62 | 87.32 |
| IV | 3 | 1 | 33.33 | 47 | 40 | 85.11 |
| V | 65 | 57 | 87.69 | 100 | 93 | 93.00 |
| Overall | 144 | 123 | 85.42 | 427 | 373 | 87.36 |

Exemplary Procedures

Figure 9:
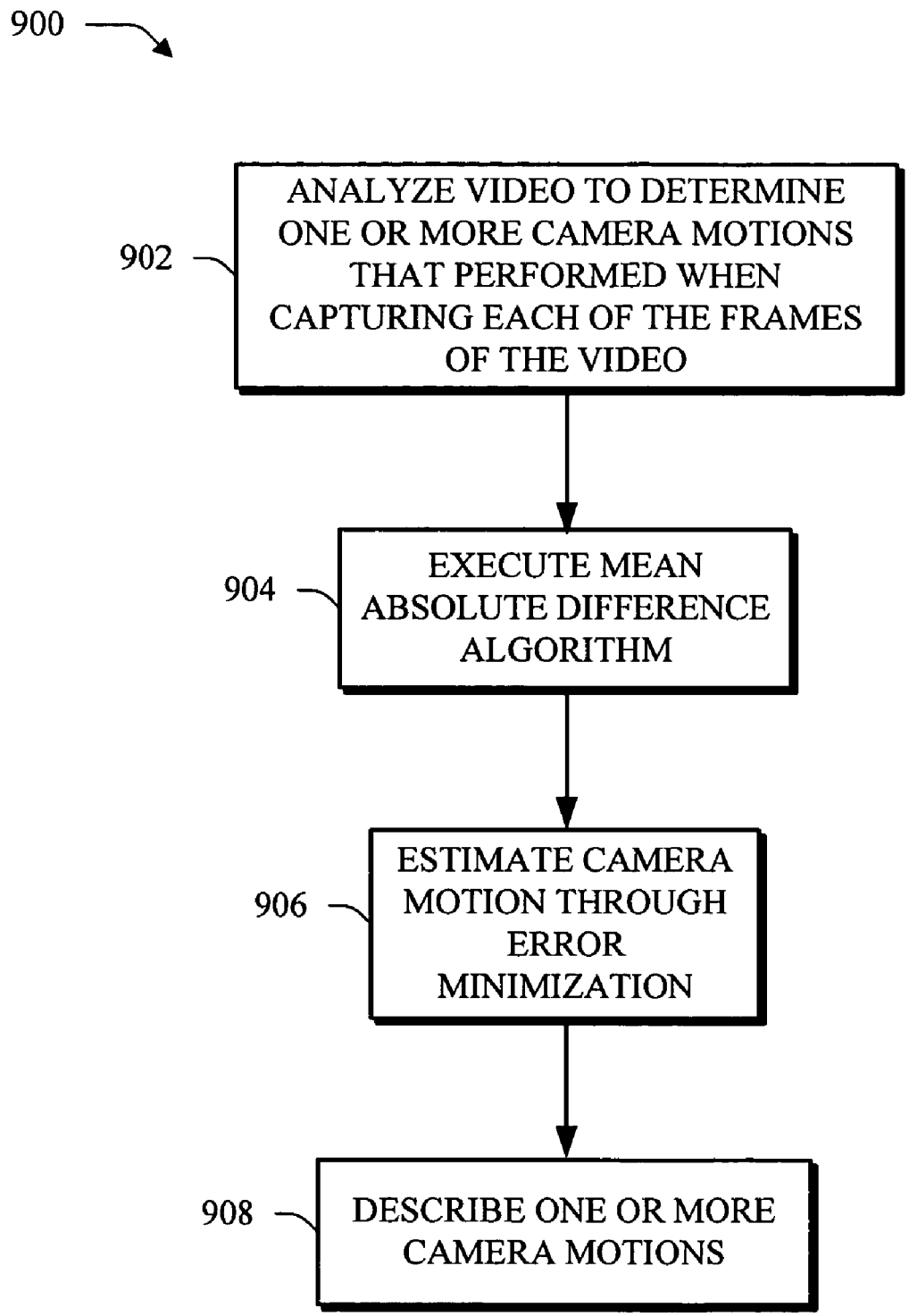
FIG. 9 is a flow chart depicting a procedure of an exemplary implementation in which sequential frames of a video are analyzed to find displacement of matching pixels in the sequential frames.

FIG. 9 is a flow chart depicting a procedure 900 of an exemplary implementation in which sequential frames of a video are analyzed to find displacement of matching pixels in the sequential frames. At block 902, the sequential frames are analyzed to determine one or more camera motions that occurred when each frame of the video was captured. The analysis may be performed in a variety of ways.

At block 904, for example, a mean absolute difference (MAD) algorithm may be executed. The MAD algorithm may utilize luminance of pixels to locate matching pixels in respective first and second frames of the video that are sequential. Additionally, the matching pixels may be selected through use of the integral matching template 400 as shown in FIG. 4. At block 906, camera motion is estimated through error minimization in parameter state space (H, V, R), which respectively refer to horizontal, vertical and radial directions.

At block 908, one or more camera motions for the first and second frames are described based on the estimated camera motions. For example, dominant motion of matching pixels in the first and second frames may be utilized to indicate one or more camera motions that were performed when capturing the first and second frames. The one or more camera motions for the first and second frames may be described by H, V, and R displacement curves, a MAD curve, and a MAJ curve. Through use of the three parameters H, V, and R described by the respective H, V, and R displacement curves, description of the camera motions is simplified by modeling similar camera motions together, such as panning/tracking, tilting/booming, and zooming/dollying. For example, changes in (H, V) are often caused by camera panning/tracking and tilting/booming, respectively. Changes in R are usually caused by camera zooming/dollying. By simplifying the description of the camera motions, the H, V, and R displacement curves may effectively reduce the computation burden of processing a video.

Figure 10:
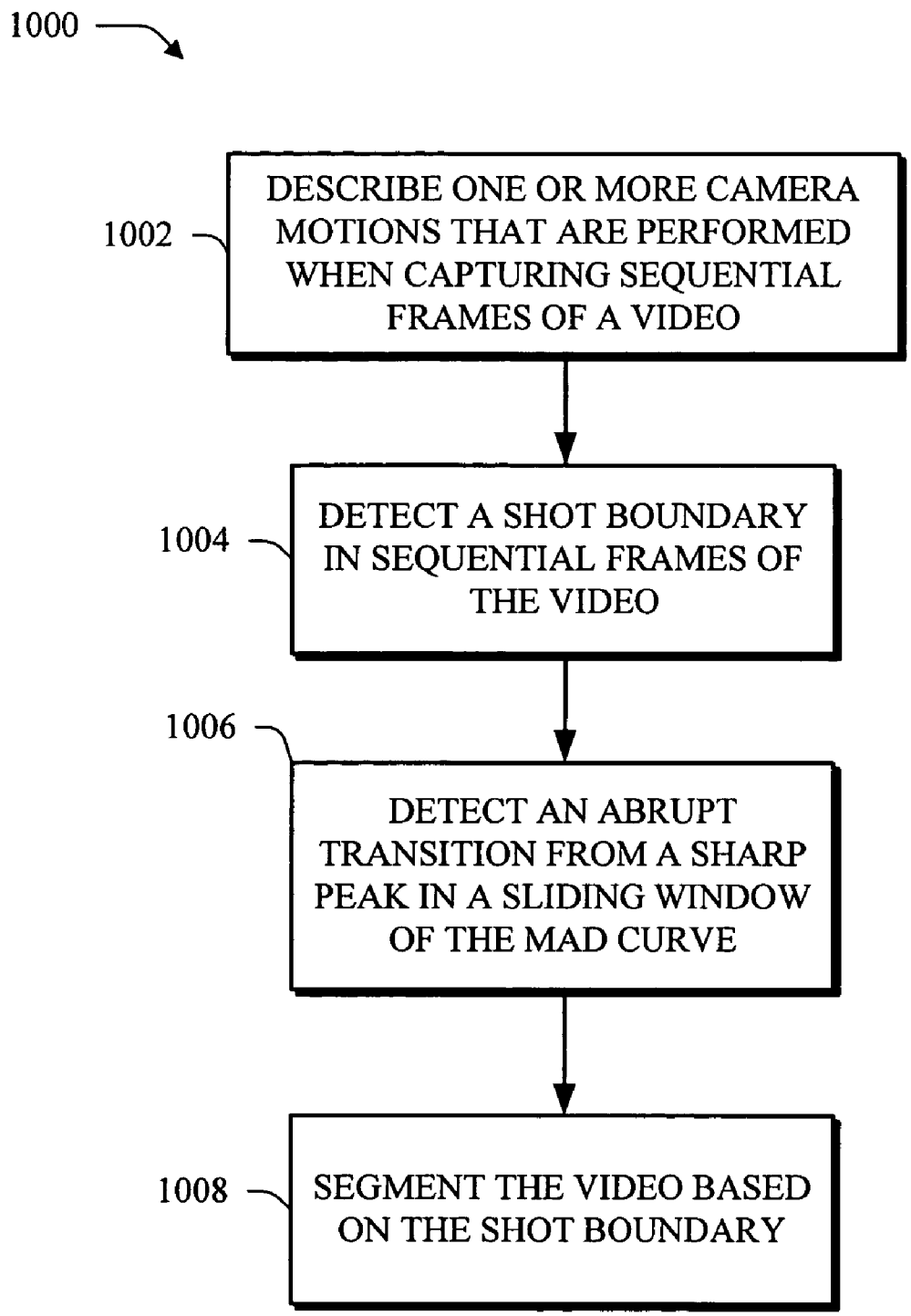
FIG. 10 is a flow chart depicting a procedure of an exemplary implementation in which one or more camera motions that are described by H, V, and R displacement curves are utilized to detect a shot boundary in a video.

FIG. 10 is a flow chart depicting a procedure 1000 of an exemplary implementation in which one or more camera motions that are described by H, V, and R displacement curves are utilized to detect a shot boundary in a video. At block 1002, one or more camera motions are described that were performed when capturing sequential frames of a video. For example, the one or more camera motions may be estimated through displacement of matching pixels in motion tracking region of an integral matching template, as was described previously in relation to FIGS. 4 and 5. The estimated camera motions may then be described through use of H, V, and R displacement curves. A MAD curve is generated from the H, V, and R displacement curves. The MAD curve describes a minimum mean absolute difference value of the H, V, and R displacement curves.

At block 1004, a shot boundary is detected in sequential frames of the video. The shot boundary may be detected in a variety of ways. As was previously described, the MAD curve describes a minimum MAD value among the three directions shown in the H, V, and R displacement curves for each frame of the video. An abrupt transition between minimum MAD values of the MAD curve may be used to indicate a shot boundary (i.e., a transition between visually consistent segments of the video) between frames having the respective minimum MAD values. At block 1006, for example, an abrupt transition is detected from a sharp peak in a sliding window of the MAD curve as previously described.

At block 1008, the video is segmented into a plurality of segments having visually consistent camera motions based on the detected shot boundaries. For example, the video may be segmented into first and second segments that are composed of sequential frames. Each of the first and second segments has visually consistent camera motions, but the first segment includes one or more camera motions that are different from the second segment.

Figure 11:
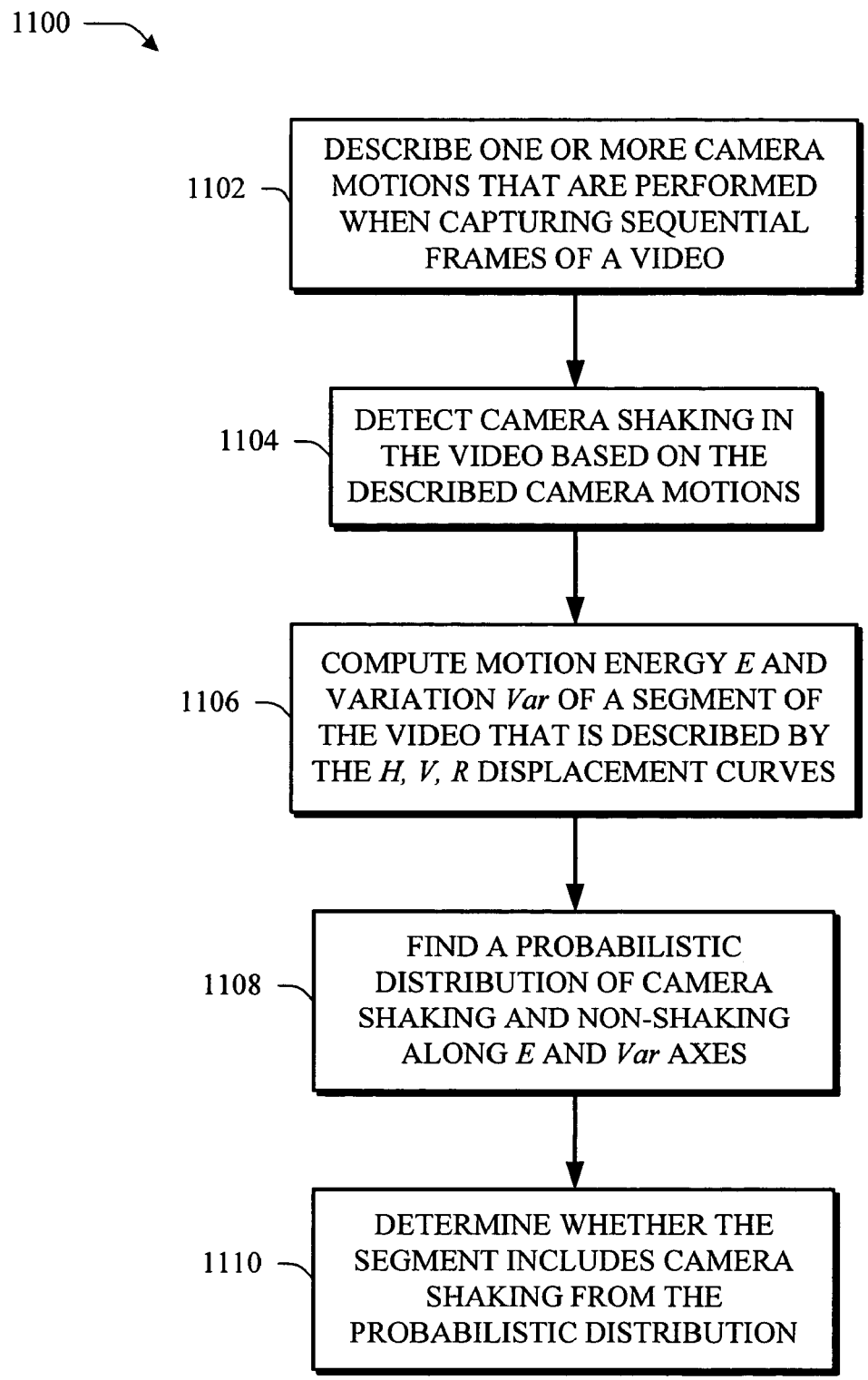
FIG. 11 is a flow chart depicting a procedure of an exemplary implementation in which one or more camera motions that are described according to a motion model are utilized to detect camera shaking.

FIG. 11 is a flow chart depicting a procedure 1100 of an exemplary implementation in which one or more camera motions that are described according to a motion model are utilized to detect camera shaking. At block 1102, one or more camera motions are described that were performed when capturing sequential frames of a video. As previously described, the one or more camera motions may be described for each frame of the video by H, V, and R displacement curves.

At block 1104, camera shaking is detected in the video based on the described camera motions. Camera shaking may be detected in a variety of ways based on described camera motions. At block 1106, for instance, motion energy E and variation Var of a segment of sequential frames of the video is computed from the H, V, and R displacement curves. At block 1108, a probabilistic distribution of camera shaking and non-shaking is found along E and Var axes based on the motion energy E and variation Var computed at block 1106.

At block 1110, a determination is then made as to whether the segment includes camera shaking from the probabilistic distribution of block 1108. For example, two hypotheses may be utilized, a first hypothesis asserting that the segment is shaking and a second hypotheses asserting that the segment is not-shaking. The probabilistic distribution may then be utilized to solve which hypothesis is true, and thus, whether the segment does or does not include shaking, as was previously described in the "Camera Shaking Detection" section.

Figure 12:
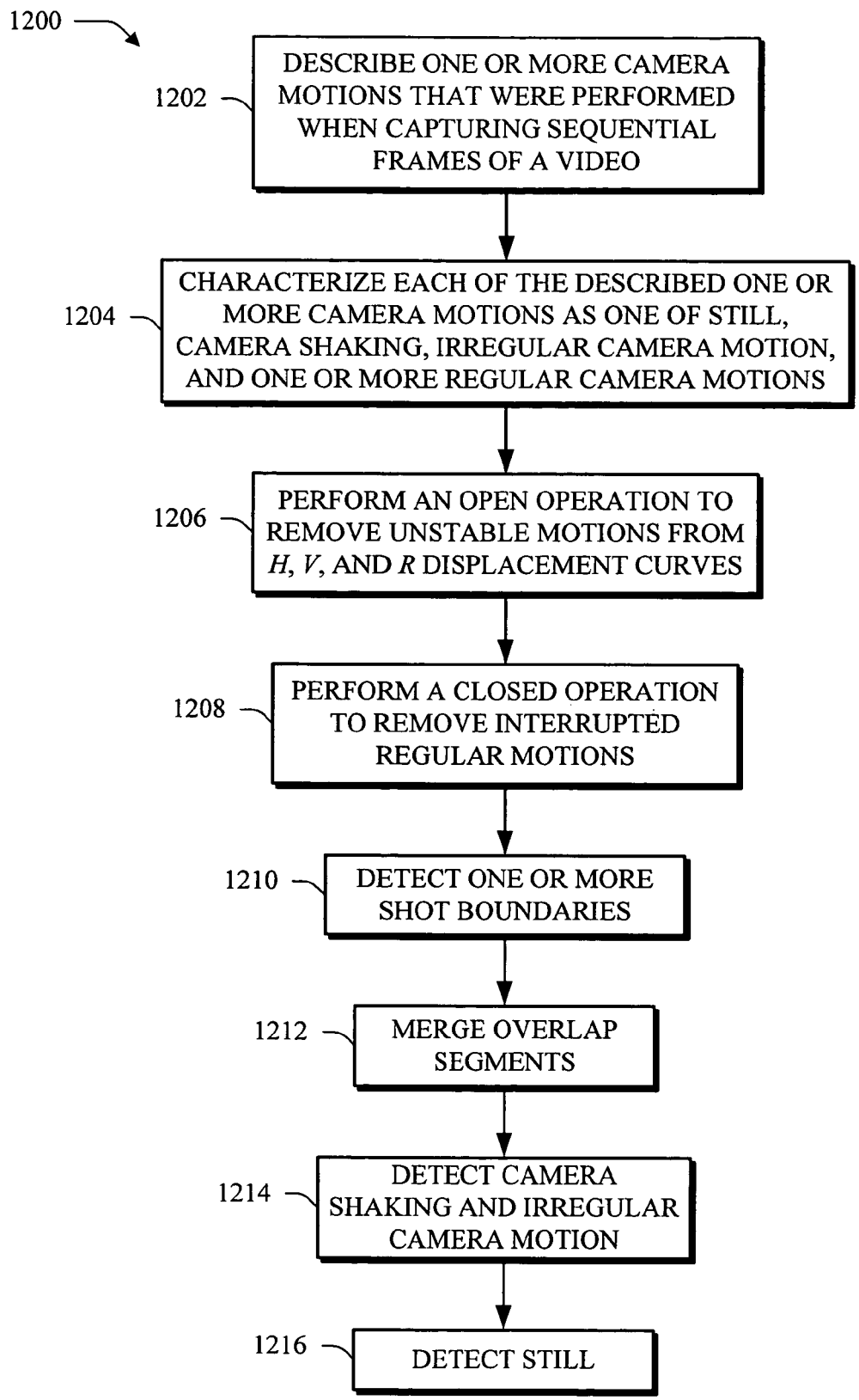
FIG. 12 is a flow chart depicting a procedure of an exemplary implementation in which one or more camera motions are described and then characterized based on the descriptions.

FIG. 12 is a flow chart depicting a procedure 1200 of an exemplary implementation in which one or more camera motions are described and then characterized based on the descriptions. At block 1202, one or more camera motions are described that were performed when capturing sequential frames of a video. As previously described, the one or more camera motions may be described for each frame of the video by H, V, and R displacement curves, a MAD curve, and a MAJ curve. The MAJ curve is a qualitative description of camera motion and is determined by the minimum MAD value from the MAD curve.

At block 1204, each of the described one or more camera motions are characterized as one of still, camera shaking, irregular camera motion, and one or more regular camera motions. The characterizing may be performed in a variety of ways. At block 1206, for example, an opening operation is performed for each of the H, V, and R displacement curves to remove unstable camera motions. The result of the open operation is regular motion H, V, and R displacement curves.

At block 1208, a closing operation is performed on each of the regular motion H, V, and R displacement curves to connect interrupted regular motions. The result of the closing operation is connected regular motion H, V, and R displacement curves. At block 1210, shot boundaries are detected based on the H, V, and R displacement curves and the connected regular motion H, V, and R displacement curves, as was described previously. For example, a MAD curve may be derived from both the H, V, and R displacement curves and the connected regular motion H, V, and R displacement curves. Peaks in the derived MAD curve may then be utilized to indicate abrupt changes and therefore shot boundaries. In another example, one or more changes in direction indicated by the H, V, and R displacement curves and/or the connected regular motion H, V, and R displacement curves may be used to indicate a shot boundary.

At block 1212, overlap segment of the connected regular motion H, V, and R displacement curves are merged. For example, if there are continuous motion segments in the of H and V curves labeled pan-right and tilt-up, respectively, that overlap each other in time, i.e. describe the same frame, the camera motions may be merged to describe camera motion as "pan-right-up".

Segments of the video that are left over, i.e. are not regular camera motions, may then be characterized. For example, at block 1214, camera shaking and irregular camera motion are characterized by computing E and Var as previously described. Reference will be made again to FIG. 2A. Region D describes irregular camera motions which have considerable motion energy, but have lower variations than that of camera shaking, which is represented by Region E. Therefore, irregular camera motion may be characterized in a manner similar to detecting camera shaking as was described in the "Camera Shaking Detection" section.

At block 1216, still camera motion is detected for characterization. Still camera motion may be detected in a variety of ways. In one implementation, still camera motion is detected in a similar manner to camera shaking and irregular camera motions as described in the previous paragraph. Reference will be made again to FIG. 2A, Region A represents still motion, which has low E and Var values. Region B represents camera vibration, i.e. slight camera shaking, which usually cannot be perceived by the human eye. Therefore, the camera motions in Region B may be considered as a still camera motion. In another implementation, still camera motion is detected from the MAJ curve. As previously described, the MAJ curve provides a qualitative description of camera motion that may also describe still camera motion. Therefore, still camera motion may be detected from the MAJ curve.

Exemplary Operating Environment

Figure 13:
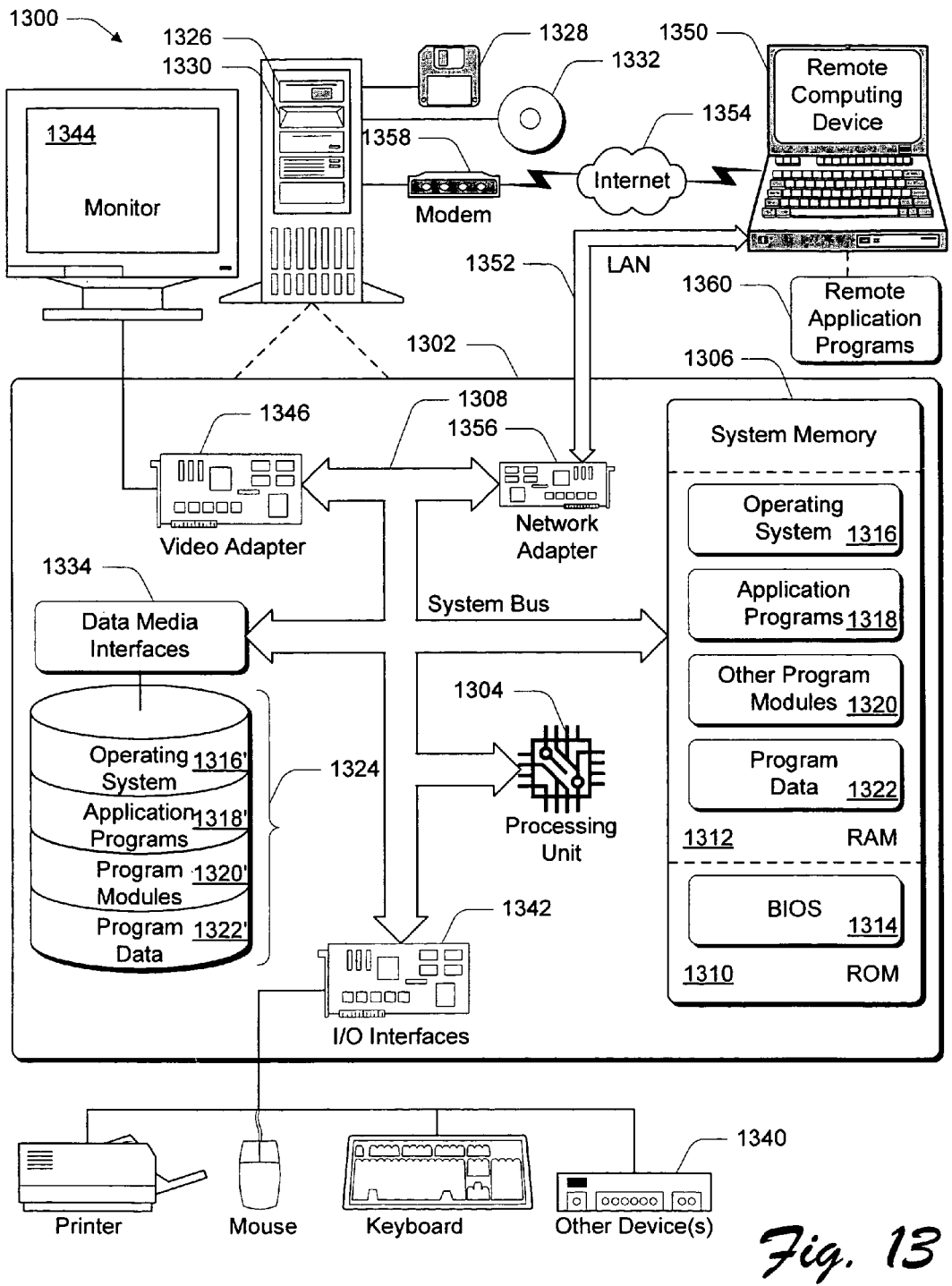
FIG. 13 shows an exemplary implementation of the client device and components thereof in a computer environment.

The various components and functionality described herein are implemented with a number of individual computers. FIG. 13 shows components of a typical example of a computer environment 1300, including a client device configured as a computer, referred by to reference numeral 1302. The components shown in FIG. 13 are only examples of an implementation, and are not intended to suggest any limitation as to the scope of the functionality of the implementation; the implementation is not necessarily dependent on the features shown in FIG. 13.

Generally, various different general purpose or special purpose computing system configurations can be used. Examples of well known computing systems, environments, and/or configurations that may be suitable for use with the implementation include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 13, the components of computer 1302 may include, but are not limited to, a processing unit 1304, a system memory 1306, and a system bus 1308 that couples various system components including the system memory to the processing unit 1304. The system bus 1308 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 1302 typically includes a variety of computer-readable media. Computer-readable media can be any available media that can be accessed by computer 1302 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1302. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1306 includes computer storage media in the form of volatile and/or nonvolatile memory such as read only memory (ROM) 1310 and random access memory (RAM) 1312. A basic input/output system 1314 (BIOS), containing the basic routines that help to transfer information between elements within computer 1302, such as during start-up, is typically stored in ROM 1310. RAM 1312 typically contains data and/or program modules that are immediately accessible to and/or presently being operated on by processing unit 1304. By way of example, and not limitation, FIG. 13 illustrates operating system 1316, application programs 1318, other program modules 1320, and program data 1322.

The computer 1302 may also include other removable/non-removable, volatile/nonvolatile computer storage media. By way of example only, FIG. 13 illustrates a hard disk drive 1324 that reads from or writes to non-removable, nonvolatile magnetic media, a magnetic disk drive 1326 that reads from or writes to a removable, nonvolatile magnetic disk 1328, and an optical disk drive 1330 that reads from or writes to a removable, nonvolatile optical disk 1332 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1324 is typically connected to the system bus 1308 through a non-removable memory interface such as data media interface 1334, and magnetic disk drive 1326 and optical disk drive 1330 are typically connected to the system bus 1308 by a removable memory interface.

The drives and their associated computer storage media discussed above and illustrated in FIG. 13 provide storage of computer-readable instructions, data structures, program modules, and other data for computer 1302. In FIG. 13, for example, hard disk drive 1324 is illustrated as storing operating system 1316', application programs 1318', other program modules 1320', and program data 1322'. Note that these components can either be the same as or different from operating system 1316, application programs 1318, other program modules 1320, and program data 1322. Operating system 1316', application programs 1318', other program modules 1320', and program data 1322' are given different numbers here to illustrate that, at a minimum, they are different copies. A user may enter commands and information into the computer 1302 through input devices such as a keyboard 1336 and pointing device 1338, commonly referred to as a mouse, trackball, or touch pad. Other input devices (not shown) may include a microphone, joystick, game pad, satellite dish, scanner, or the like. These and other input devices 1340 are often connected to the processing unit 1302 through an input/output (I/O) interface 1342 that is coupled to the system bus, but may be connected by other interface and bus structures, such as a parallel port, game port, or a universal serial bus (USB). A monitor 1344 or other type of display device is also connected to the system bus 1308 via an interface, such as a video adapter 1346. In addition to the monitor 1344, computers may also include other peripheral output devices (e.g., speakers) and one or more printers 1348, which may be connected through the IO interface 1342.

The computer may operate in a networked environment using logical connections to one or more remote computers, such as a remote computing device 1350. The remote computing device 1350 may be a personal computer, a server, a router, a network PC, a peer device or other common network node, and typically includes many or all of the elements described above relative to computer 1302. The logical connections depicted in FIG. 13 include a local area network (LAN) 1352 and a wide area network (WAN) 1354. Although the WAN 1354 shown in FIG. 13 is the Internet, the WAN 1354 may also include other networks. Such networking environments are commonplace in offices, enterprise-wide computer networks, intranets, and the like.

When used in a LAN networking environment, the computer 1302 is connected to the LAN 1352 through a network interface or adapter 1356. When used in a WAN networking environment, the computer 1302 typically includes a modem 1358 or other means for establishing communications over the Internet 1354. The modem 1358, which may be internal or external, may be connected to the system bus 1308 via the I/O interface 1342, or other appropriate mechanism. In a networked environment, program modules depicted relative to the computer 1302, or portions thereof, may be stored in the remote computing device 1350. By way of example, and not limitation, FIG. 13 illustrates remote application programs 1360 as residing on remote computing device 1350. It will be appreciated that the network connections shown are exemplary and other means of establishing a communication between the computers may be used.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    describing one or more camera motions that occurred when sequential frames of a video were captured, the description for each said frame being provided by:
        a set of displacement curves that describe the one or more camera motions in respective horizontal (H), vertical (V), and radial (R) directions; and
        a mean absolute difference (MAD) curve that describes a minimum MAD value of the set of displacement curves; and
    detecting a shot boundary in the sequential frames by an abrupt transition of the minimum MAD values within the sequential frames, wherein the abrupt transition is indicated by a peak in the minimum MAD values described by the MAD curve.

2. A method as described in claim 1, further comprising characterizing each of the described one or more camera motions as one of still, camera shaking, irregular camera motion, and one or more regular camera motions.

3. A method as described in claim 1, wherein the shot boundary is detected by examining a central said frame, denoted by k, of a sliding window containing N of said frames such that when each of the criteria defined by (a), (b), and (c) as follows are true for the minimum MAD value of the central said frame k, the abrupt transition is detected at the central said frame k:

$$MAD(k) = \max(MAD(i)), i = k - N/2, \ldots, k + N/2; \quad (a)$$

$$MAD(k) \geq \alpha_{low} MAD_{sm} + \beta; \text{ and} \quad (b)$$

$$MAD(k) \geq \alpha_{high} \frac{\sum_{i=-N/2, i \neq k}^{N/2} MAD(i)}{N} + \beta, \quad (c)$$

wherein $\alpha_{low}$, $\alpha_{high}$ and $\beta$ are constants, and $MAD_{sm}$ is a second maximum of the N-frames sliding window.

4. A method as described in claim 1, further comprising generating the set of displacement curves by:
  comparing the sequential frames, one to another, utilizing an integral matching template to find matching pixels in respective said frames;
  determining displacement of the matching pixels in the compared sequential frames; and
  describing the displacement utilizing the set of displacement curves.

5. A method as described in claim 1, further comprising segmenting the video into a plurality of segments based on the detected shot boundary, each said segment having one or more said camera motions that are visually consistent.

6. One or more computer-readable media comprising computer storage media with computer-executable instructions that, when executed, perform the method as recited in claim 1.

7. A method comprising:
  describing one or more camera motions that occurred when sequential frames of a video were captured, the description for each said frame being provided by a set of displacement curves that describe the one or more camera motions in respective horizontal (H), vertical (V), and radial (R) directions; and
  detecting camera shaking in the video based on the described camera motions in the set of displacement curves, wherein the detecting includes defining motion energy E and variation Var based on the set of displacement curves.

8. A method as described in claim 7, wherein the detecting includes:
  computing motion energy E and variation Var for a segment of the video from the set of displacement curves, wherein the segment includes at least two of the sequential frames;
  finding a probabilistic distribution of camera shaking and non-shaking along E and Var axes; and
  determining whether the segment includes camera shaking from the probabilistic distribution.

9. A method as described in claim 7, wherein the camera shaking is detected for a segment of the video, denoted as $t_1$ to $t_2$, having at least two of the sequential frames by:
  computing motion energy E and variation Var based on the set of displacement curves to find a distribution of shaking and non-shaking in E-Var space, wherein E and Var are computed as follows:

$$E = \frac{1}{t_2 - t_1} \sqrt{\sum_x \left( \int_{t_1}^{t_2} |x| dt \right)^2}, x \in \{H, V, R\}; \text{ and}$$

$$\text{Var} = \frac{1}{t_2 - t_1} \sum_x \left( \int_{t_1}^{t_2} |\nabla_x| dt \right), x \in \{H, V, R\}$$

wherein "$\nabla$" is a differential operator to compute relative variation;

finding a probabilistic distribution of camera shaking and non-shaking along E and Var axes by:
  quantifying both the E axis and the Var axis to form a plurality of levels; and
  accumutating motion energy E and variation Var in respective said levels to form the probabilistic distribution; and determining whether the segment includes camera shaking from the probabilistic distribution by:
  computing average error probability $P_E$ wherein:

$$P_E = P(S) \int_{R_{\overline{S}}} p(x|S) dx + P(\overline{S}) \int_{R_S} p(x|\overline{S}) dx$$

S is a hypothesis that the segment is shaking;
  $\overline{S}$ in a hypothesis that the segment is non-shaking;
  P(s) and P($\overline{S}$) are prior probabilities for existence of shaking and non-shaking, respectively;
  $R_{\overline{S}}$) is a missed detection area; and
  $R_S$ is a false detection area; and
  obtaining optimal decisions $T_E$ and $T_V$ based on a minimization of
$P_E$ by a likelihood ratio test wherein:
  if the segment satisfies optimal decisions $T_E$ and $T_V$, the segment includes camera shaking; and
the optimal decisions $T_E$ and $T_V$ obtained as follows:

$$T = \log \frac{P(S)P(E|S)}{P(\overline{S})P(E|\overline{S})} \overset{\overline{S}}{\underset{S}{\gtrless}} 0.$$

10. A method as described in claim 7 further comprising generating the set of displacement curves by:
  comparing the sequential frames, one to another, utilizing an integral matching template to find matching pixels in respective said frames;
  determining displacement of the matching pixels in the compared sequential frames; and
  describing the displacement utilizing the set of displacement curves.

11. One or more computer-readable media comprising computer storage media with computer-executable instructions that, when executed, perform the method as recited in claim 7.

12. A method comprising:
  describing one or more camera motions that occurred when sequential frames of a video were captured, the description for each said frame being provided by:
    a set of displacement curves that describe the one or more camera motions in respective horizontal (H), vertical (V), and radial (R) directions;
    a mean absolute difference (MAD) curve that describes a minimum MAD value of the set of displacement curves; and a MAT curve that is a qualitative description of the one or more camera motions and is determined from the minimum MAD value of the MAD curve; and characterizing each of the described one or more camera motions as one of still, camera shaking, irregular camera motion, and one or more regular camera motions.

13. A method as described in claim 12, wherein the qualitative description of camera motion includes still, horizontal, vertical and radial.

14. A method as described in claim 12, further comprising generating the set of displacement curves by:

comparing the sequential frames, one to another, utilizing an integral matching template to find matching pixels in respective said frames;

determining displacement of the matching pixels in the compared sequential frames; and describing the displacement utilizing the set of displacement curves.

15. A method as described in claim 12, wherein the characterizing includes:

morphological filtering of the set of displacement curves by:

performing an opening operation to remove unstable motions from the set of displacement curves to form a set of regular motion displacement curves; and performing a closing operation on the set of regular motion displacement curves to connect interrupted regular motions to form a set of connected regular motion displacement curves;

detecting shot boundaries based on the set of connected regular motion displacement curves; and merging overlap segments of the set of connected regular motion displacement curves to form one or more motion segments which describe regular camera motions that are included in at least two of the set of connected regular motion displacement curves.

16. A method as described in claim 12, wherein the characterizing further comprises:

defining motion energy E and variation V based on the set of displacement curves to detect the camera shaking and the irregular camera motion; and detecting the still camera motion from the MAJ curve.

17. A method as described in claim 12, wherein the one or more regular camera motions are selected from the group consisting of:

panning;
tilting;
zooming;
tracking;
booming;
dollying; and
any combination thereof.

18. One or more computer-readable media comprising computer storage media with computer-executable instructions that, when executed, perform the method as recited in claim 12.

19. A method comprising:

analyzing video having sequential frames to determine one or more camera motions that occurred when sequential frames of the video were captured; and describing the one or more camera motions for each said frame by:

a set of displacement curves that describe the one or more camera motions in respective horizontal (H), vertical (V), and radial (R) directions;

a mean absolute difference (MAD) curve that relates a minimum MAD value from the set of displacement curves; and a major motion (MAJ) curve that:

is generated from the minimum MAD value; and provides one or more qualitative descriptions that describe the one or more camera motions as one of still, vertical, horizontal and radial.

20. A method as described in claim 19, further comprising detecting a shot boundary in the sequential frames from an abrupt transition of respective said minimum MAD values.

21. A method as described in claim 19, further comprising detecting a shot boundary in the sequential frames from an abrupt transition by examining a central said frame, denoted by k, of a sliding window containing N of said frames such that when each of the criteria defined by (a), (b), and (c) as follows are true for the minimum MAD value of the central said frame k, the abrupt transition is detected at the central said frame k:

$$MAD(k) = \max(MAD(i)), i = k - N/2, \ldots, k + N/2; \quad (a)$$

$$MAD(k) \geq \alpha_{low} MAD_{sm} + \beta; \text{ and} \quad (b)$$

$$MAD(k) \geq \alpha_{high} \frac{\sum_{i=-N/2, i \neq k}^{N/2} MAD(i)}{N} + \beta, \quad (c)$$

wherein $\alpha_{low}$, $\alpha_{high}$ and $\beta$ are constants, and $MAD_{sm}$ is a second maximum of the N-frames sliding window.

22. A method as described in claim 19, further comprising detecting camera shaking in the video by defining motion energy E and variation Var based on the set of displacement curves.

23. A method as described in claim 19, further comprising detecting camera shaking by:

computing motion energy E and variation Var for a segment of the video from the set of displacement curves, wherein the segment includes at least two of the sequential frames;

finding a probabilistic distribution of camera shaking and non-shaking along E and Var axes; and determining whether the segment includes camera shaking from the probabilistic distribution.

24. A method as described in claim 19, further comprising detecting camera shaking for a segment of the video, denoted as $t_1$ to $t_2$, having at least two of the sequential frames by:

computing motion energy E and variation Var based on the set of displacement curves to find a distribution of shaking and non-shaking in E-Var space, wherein F and Var are computed as follows:

$$E = \frac{1}{t_2 - t_1} \sqrt{\sum_x \left( \int_{t_1}^{t_2} |x| dt \right)^2}, x \in \{H, V, R\}; \text{ and}$$

$$Var = \frac{1}{t_2 - t_1} \sum_x \left( \int_{t_1}^{t_2} |\nabla x| dt \right), x \in \{H, V, R\}$$

wherein "∇" is a differential operator to compute relative variation;

finding a probabilistic distribution of camera shaking and non-shaking along E and Var axes by:

quantifying both the E axis and the Var axis to form a plurality of levels; and accumulating motion energy E and variation Var in respective said levels to form the probabilistic distribution; and determining whether the segment includes camera shaking from the probabilistic distribution by:

computing average error probability $P_E$ wherein:

$$P_E = P(S) \int_{R_{\overline{S}}} p(x|S) dx + P(\overline{S}) \int_{R_S} p(x|\overline{S}) dx$$

S is a hypothesis that the segment is shaking;
$\overline{S}$ is a hypothesis that the segment is non-shaking;
$P(S)$ and $P(\overline{S})$ are prior probabilities for existence of shaking and non-shaking, respectively;
$R_{\overline{S}}$ is a missed detection area; and
$R_S$ is a false detection area; and obtaining optimal decisions $T_E$ and $T_V$ based on a minimization of $P_E$ by a likelihood ratio test wherein:
if the segment satisfies optimal decisions $T_E$ and $T_V$, the segment includes camera shaking; and
the optimal decisions $T_E$ and $T_V$ obtained as follows:

$$T = \log \frac{P(S)P(E|S)}{P(\overline{S})P(E|\overline{S})} \begin{array}{c} \overline{S} \\ < \\ > \\ S \end{array} 0.$$

25. A method as described in claim 19, further comprising characterizing each of the described one or more camera motions as one of still camera motion, camera shaking, irregular camera motion, and one or more regular camera motions.

26. A method as described in claim 25, wherein the one or more regular camera motions are selected from the group consisting of:
panning;
tilting;
zooming;
tracking;
booming;
dollying; and
a combination thereof.

27. A method as described in claim 19, further comprising characterizing each of the described one or more camera motions as one or more regular camera motions by:
morphological filtering of the set of displacement curves by:
performing an opening operation to remove unstable motions from the set of displacement curves to form a set of regular motion displacement curves; and
performing a closing operation on the set of regular motion displacement curves to connect interrupted regular motions to form a set of connected regular motion displacement curves;
detecting shot boundaries based on the set of connected regular motion displacement curves; and
merging overlap segments of the set of connected regular motion displacement curves to form one or more motion segments which describe regular camera motions that are included in at least two of the set of connected regular motion displacement curves.

28. A method as described in claim 19, wherein the analyzing is performed by:
executing a Mean Absolute Difference (MAD) algorithm based on luminance (L), wherein:

luminance (L) is utilized to match pixels in respective first and second said frames; and
the MAD between the first said frame, denoted as k, and the second said frame, denoted as k+1, is computed as follows:

$$MAD(\Delta x) = \frac{1}{N} \sum_{x \in T} |L(x + \Delta x, k+1) - L(x, k)|$$

wherein T is a set of the matching pixels and "N" is a total number of the matching pixels; and
estimating camera motion though error minimization in parameter state space (H, V, R), which respectively denote the horizontal, the vertical, and the radial directions, wherein:
for each said direction on (H, V, R), optimal matching is obtained when a minimum MAD is reached as follows:

$$(H, V, R) = \arg\min_{\Delta x \in \psi} MAD(\Delta x)$$

$\Psi$ is a state space of a plurality of camera motion candidates; and
the camera motion candidate that yields a best match is an optimal estimation of camera motion.

29. A method as described in claim 19, further comprising generating the set of displacement curves by:
comparing the sequential frames, one to another, utilizing an integral matching template to find matching pixels in respective said frames;
determining displacement of the matching pixels in the compared sequential frames; and
describing the displacement utilizing the set of displacement curves.

30. One or more computer-readable media comprising computer-executable instructions that, when executed, perform the method as recited in claim 19.

31. A computer comprising:
video having sequential frames;
a set of displacement curves that describe one or more camera motions that occurred when sequential frames of a video were captured in respective horizontal (H), vertical (V), and radial (R) directions;
a mean absolute difference (MAD) curve that relates a minimum MAD value of the set of displacement curves for each said frame; and
a major motion (MAJ) curve that is a qualitative description of camera motion for each said frame and is determined from the minimum MAD value of the MAD curve; and
a video analysis module this is executable to:
detect a shot boundary in the sequential frames from an abrupt transition of respective said minimum MAD values;
detect camera shaking in the sequential frames based on the described camera motions in the set of displacement curves; and
characterize each of the one or more camera motions as one of still camera motion, camera shaking, irregular camera motion, and one or more regular camera motions.

32. A computer as described in claim 31, wherein the video analysis module is executable to generate the set of displacement curves by:
  comparing the sequential frames, one to another, utilizing an integral matching template to find matching pixels in respective said frames;
  determining displacement of the matching pixels in the compared sequential frames; and
  describing the displacement utilizing the set of displacement curves.

33. A computer as described in claim 31, wherein the video analysis module is executable to:
  executing a Mean Absolute Difference (MAD) algorithm based on luminance (L), wherein:
    luminance (L) is utilized to match pixels in respective first and second said frames; and
    the MAD between the first said frame, denoted as k, and the second said frame, denoted as k+1, is computed as follows:

$$MAD(\Delta x) = \frac{1}{N} \sum_{x \in T} |L(x + \Delta x, k+1) - L(x, k)|$$

wherein T is a set of the matching pixels and "N" is a total number of the matching pixels; and
  estimating camera motion through error minimization in parameter state space (H, V, R), which respectively denote the horizontal, the vertical, and the radial directions, wherein:
  for each said direction (H, V, R), optimal matching is obtained when a minimum MAD is reached as follows:

$$(H, V, R) = \arg \min_{\Delta x \in \psi} MAD(\Delta x)$$

Ψ is a state space of a plurality of camera motion candidates; and
  the camera motion candidate that yields a best match is an optimal estimation of camera motion.

34. A computer as described in claim 31, wherein the video analysis module is executable to detect the shot boundary by examining a central said frame, denoted by k, of a sliding window containing N of said frames such that when each of the criteria defined by (a), (b), and (c) as follows are true for the minimum MAD value of the central said frame k, the abrupt transition is detected at the central said frame k:

(a) $MAD(k) = \max(MAD(i)), i = k - N/2, \ldots, k + N/2;$ (b) $MAD(k) \geq \alpha_{low} MAD_{sm} + \beta;$ and (c) $MAD(k) \geq \alpha_{high} \dfrac{\sum_{i=-N/2, i \neq k}^{N/2} MAD(i)}{N} + \beta,$ wherein $\alpha_{low}$, $\alpha_{high}$ and β are constants, and $MAD_{sm}$ is a second maximum of the N-frames sliding window.

35. A computer as described in claim 31, wherein the video analysis module is executable to detect camera shaking by defining motion energy E and variation Var based on the set of displacement curves.

36. A computer as described in claim 31, wherein the video analysis module is executable to detect camera shaking by:
  computing motion energy E and variation Var for a segment of the video from the set of displacement curves, wherein the segment includes at least two of the sequential frames;
  finding a probabilistic distribution of camera shaking and non-shaking along E and Var axes; and
  determining whether the segment includes camera shaking from the probabilistic distribution.

37. A computer as described in claim 31, wherein the video analysis module is executable to detect camera shaking for a segment of the video, denoted as $t_1$ to $t_2$, having at least two of the sequential frames by:
  computing motion energy E and variation Var based on and the set of displacement curves to find a distribution of shaking and non-shaking in E-Var space, wherein E and Var are computed as follows:

$$E = \frac{1}{t_2 - t_1} \sqrt{\sum_x \left(\int_{t_1}^{t_2} |x| dt\right)^2}, x \in \{H, V, R\}; \text{ and}$$

$$Var = \frac{1}{t_2 - t_1} \sum_x \left(\int_{t_1}^{t_2} |\nabla x| dt\right), x \in \{H, V, R\}$$

wherein "∇" is a differential operator to compute relative variation;
  finding a probabilistic distribution of camera shaking and non-shaking along E and Var axes by:
    quantifying both the E axis and the Var axis to form a plurality of levels; and
    accumulating motion energy and variation Var in respective said levels to form the probabilistic distribution; and
  determining whether the segment includes camera shaking from the probabilistic distribution by:
    computing average error probability $P_E$ wherein:

$$P_E = P(S) \int_{R_{\overline{S}}} p(x|S) dx + P(\overline{S}) \int_{R_S} p(x|\overline{S}) dx$$

S is a hypothesis that the segment is shaking;
    $\overline{S}$ is a hypothesis that the segment is non-shaking;
    $P(S)$ and $P(\overline{S})$ are prior probabilities for existence of shaking and non-shaking, respectively;
    $R_{\overline{S}}$ is a missed detection area; and
    $R_S$ is a false detection area; and
  obtaining optimal decisions $T_E$ and $T_V$ based on a minimization of
  $P_E$ by a likelihood ratio test wherein:
    if the segment satisfies optimal decisions $T_E$ and $T_V$, the segment includes camera shaking; and
    the optimal decisions $T_E$ and $T_V$ obtained as follows:

$$T = \log \frac{P(S) P(E|S)}{P(\overline{S}) P(E|\overline{S})} \begin{array}{c} \overline{S} \\ < \\ > \\ S \end{array} 0.$$

38. A computer as described in claim 31, wherein the video analysis module is executable to characterize by:
  morphological filtering of the set of displacement curves by:

performing an opening operation to remove unstable motions from the set of displacement curves to form a set of regular motion displacement curves; and performing a closing operation on the set of regular motion displacement curves to connect interrupted regular motions to form a set of connected regular motion displacement curves;

detecting shot boundaries based on the set of connected regular motion displacement curves; and merging overlap segments of the set of connected regular motion displacement curves to form one or more motion segments which describe regular camera motions that are included in at least two of the set of connected regular motion displacement curves.

39. A computer as described in claim 31, wherein the regular camera motions are selected from the group consisting of:

panning;

tilting;

zooming;

tracking;

booming;

dollying; and a combination thereof.

40. A computer as described in claim 31, wherein the video analysis module is executable to characterize by:

defining motion energy E and variation V based on the set of displacement curves to detect the camera shaking and the irregular camera motion; and detecting the still camera motion from the MAJ curve.

* * * * *